(12) United States Patent
Ohta et al.

(10) Patent No.: US 12,287,883 B2
(45) Date of Patent: Apr. 29, 2025

(54) ANALYSIS SYSTEM, METHOD, AND PROGRAM

(71) Applicant: NEC Corporation, Tokyo (JP)

(72) Inventors: Yoshinobu Ohta, Tokyo (JP); Hirofumi Ueda, Tokyo (JP); Shunichi Kinoshita, Tokyo (JP); Ryo Mizushima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 412 days.

(21) Appl. No.: 17/775,941

(22) PCT Filed: Nov. 15, 2019

(86) PCT No.: PCT/JP2019/044820
§ 371 (c)(1),
(2) Date: May 11, 2022

(87) PCT Pub. No.: WO2021/095223
PCT Pub. Date: May 20, 2021

(65) Prior Publication Data
US 2022/0414229 A1  Dec. 29, 2022

(51) Int. Cl.
*G06F 15/16* (2006.01)
*G06F 21/57* (2013.01)

(52) U.S. Cl.
CPC ...... *G06F 21/577* (2013.01); *G06F 2221/034* (2013.01)

(58) Field of Classification Search
CPC .................. G06F 21/577; G06F 2221/034
See application file for complete search history.

(56) References Cited

U.S. PATENT DOCUMENTS

| | | | | |
|---|---|---|---|---|
| 8,881,288 B1* | 11/2014 | Levy | ...................... | G06F 21/577 |
| | | | | 709/225 |
| 9,292,695 B1* | 3/2016 | Bassett | ................. | G06F 21/577 |
| 11,720,844 B2* | 8/2023 | Ladnai | .................. | G06F 11/079 |
| | | | | 726/23 |

(Continued)

FOREIGN PATENT DOCUMENTS

| | | |
|---|---|---|
| JP | 2001-216161 A | 8/2001 |
| JP | 2017-224053 A | 12/2017 |
| WO | 2019/193958 A1 | 10/2019 |

OTHER PUBLICATIONS

International Search Report for PCT Application No. PCT/JP2019/044620, mailed on Jan. 7, 2020.

(Continued)

*Primary Examiner* — Oleg Survillo

(57) ABSTRACT

An analysis unit 6 generates one or more pairs of a start point fact which is a fact representing possibility of the attack in a device that is a start point and an end point fact which is a fact representing possibility of the attack in the device that is an end point, analyzes, for each pair, whether or not it is possible to derive the end point fact from the start point fact, based on facts representing states of the devices generated based on information regarding the device that is the start point and information regarding the device that is the end point, the start point fact, and one or more analysis rules for analyzing the attack, and generates an attack scenario in a case where it is possible to derive the end point fact from the start point fact.

16 Claims, 23 Drawing Sheets

(56) References Cited

U.S. PATENT DOCUMENTS

| | | | |
|---|---|---|---|
| 12,052,272 B2* | 7/2024 | Ladnai | H04L 63/20 |
| 2001/0013094 A1 | 8/2001 | Etoh et al. | |
| 2005/0138413 A1* | 6/2005 | Lippmann | G06F 21/577 |
| | | | 726/4 |
| 2010/0058456 A1 | 3/2010 | Jajodia et al. | |
| 2015/0326600 A1* | 11/2015 | Karabatis | H04L 63/20 |
| | | | 726/25 |
| 2016/0205122 A1* | 7/2016 | Bassett | H04L 63/1441 |
| | | | 726/23 |
| 2019/0081970 A1* | 3/2019 | Teramoto | H04L 63/1416 |
| 2019/0342307 A1* | 11/2019 | Gamble | G06F 16/907 |
| 2020/0065483 A1* | 2/2020 | Mu | G06F 21/554 |
| 2020/0134076 A1* | 4/2020 | Ogrinz | G06F 7/14 |
| 2020/0175071 A1* | 6/2020 | Ogrinz | G06F 16/284 |
| 2020/0177615 A1* | 6/2020 | Grabois | H04L 63/20 |
| 2020/0410109 A1* | 12/2020 | Yamada | G06F 21/577 |
| 2021/0006582 A1* | 1/2021 | Yamada | H04L 63/1433 |
| 2021/0099490 A1* | 4/2021 | Crabtree | H04L 63/20 |
| 2021/0117536 A1 | 4/2021 | Takeuchi | |
| 2022/0124108 A1* | 4/2022 | Gamble | G06F 16/907 |
| 2022/0124115 A1* | 4/2022 | Grabois | H04L 63/1433 |

OTHER PUBLICATIONS

English translation of Written opinion for PCT Application No. PCT/JP2019/044620, mailed on Jan. 7, 2020.

\* cited by examiner

FIG 4

ARBITRARY CODE EXECUTION (attacker, DstHost, administrative privileges){
- NETWORK CONNECTION (SrcHost, DstHost, http, 80)
- VULNERABILITY (DstHost, CVEID, 'software 1', remote, privileges escalation)
- ACCESS (attacker, SrcHost, administrator)
- RULE NAME ('exec01')
}

FIG. 14

| PATTERN NUMBER | ATTACK CONDITION | ATTACK RESULT | PATTERN OVERVIEW | ATTACK RISK | USER INVOLVEMENT | ATTACK MEANS | SEGMENT |
|---|---|---|---|---|---|---|---|
| 1 | ARBITRARY CODE EXECUTION/ GENERAL PRIVILEGES | DATA TAMPERING / ADMINISTRATIVE PRIVILEGES | [DESCRIPTION OF ATTACK PATTERN (PREDEFINED)] | 10.0 | YES | CVE-2010-000x CVE-2010-000y | S1, S2 |
| 2 | ARBITRARY CODE EXECUTION/ GENERAL PRIVILEGES | DATA TAMPERING / ADMINISTRATIVE PRIVILEGES | [DESCRIPTION OF ATTACK PATTERN (PREDEFINED)] | 9.0 | YES | SMB | S1, S2 |
| 3 | ARBITRARY CODE EXECUTION/ ADMINISTRATIVE PRIVILEGES | ARBITRARY CODE EXECUTION/ ADMINISTRATIVE PRIVILEGES | [DESCRIPTION OF ATTACK PATTERN (PREDEFINED)] | 6.5 | YES | ArpSpoofing | S1, S2, S3, S4 |

FIG. 15

| PATTERN NUMBER | ATTACK CONDITION | ATTACK RESULT | PATTERN OVERVIEW | ATTACK RISK | USER INVOLVEMENT | ATTACK MEANS | SEGMENT |
|---|---|---|---|---|---|---|---|
| 1 | ARBITRARY CODE EXECUTION/ GENERAL PRIVILEGES | DATA TAMPERING / ADMINISTRATIVE PRIVILEGES | [DESCRIPTION OF ATTACK PATTERN (PREDEFINED)] | 10.0 | YES | | |
| 2 | ARBITRARY CODE EXECUTION/ GENERAL PRIVILEGES | DATA TAMPERING / ADMINISTRATIVE PRIVILEGES | [DESCRIPTION OF ATTACK PATTERN (PREDEFINED)] | 9.0 | YES | | |
| 3 | ARBITRARY CODE EXECUTION/ ADMINISTRATIVE PRIVILEGES | ARBITRARY CODE EXECUTION/ ADMINISTRATIVE PRIVILEGES | [DESCRIPTION OF ATTACK PATTERN (PREDEFINED)] | 6.5 | YES | ArpSpoofing | |
| ... | ... | ... | ... | ... | ... | | |

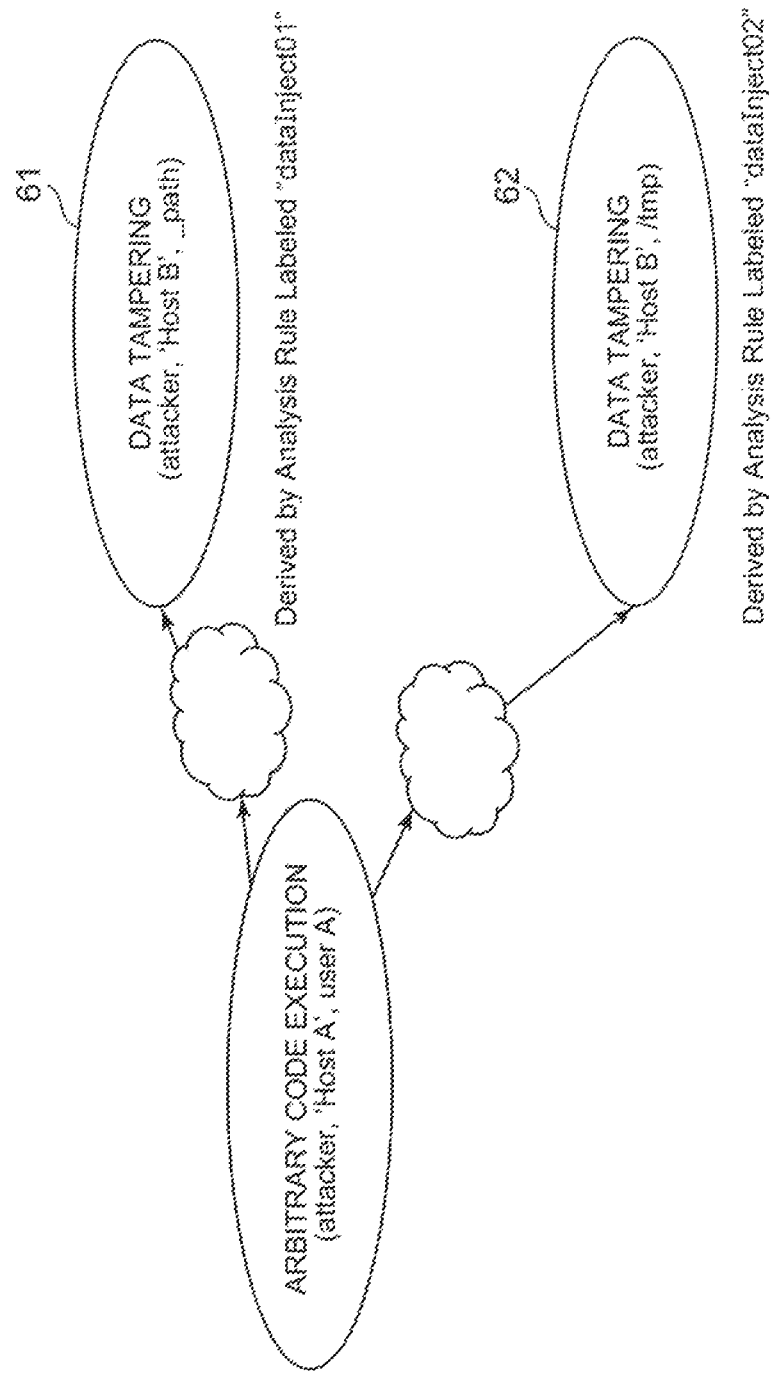

FIG. 17

```
DATA TAMPERING (attacker, DstHost, _path)X
-VULNERABILITY (DstHost, CVEID, Program, remote, data tampering)
-ACCESS (attacker, DstHost, User)
-RULE NAME ('dataInject01')
```

FIG. 18

DATA TAMPERING (attacker, DstHost, Path){
-DATA SHARING (SrcHost, Program, Flow, User)
-DATA FLOW (SrcHost, DstHost, Flow)
-DATA ACCESS (Flow, DstHost, Path)
-ACCESS (attacker, DstHost, User)
-RULE NAME (dataInject02)
}

ANALYSIS SYSTEM, METHOD, AND PROGRAM

This application is a National Stage Entry of PCT/JP2019/044820 filed on Nov. 15, 2019, the contents of all of which are incorporated herein by reference, in their entirety.

TECHNICAL FIELD

The present invention relates to an analysis system, analysis method, and analysis program for analyzing attacks on systems to be diagnosed.

BACKGROUND ART

An information processing system that includes multiple computers is required to take security measures to protect information assets from cyber attacks. Security measures include assessing vulnerability of the target system and removing vulnerability as necessary.

Patent literature 1 describes a system that generates a directed acyclic graph representing a relationship between each device and vulnerability of each device as a devise risk assessment model.

CITATION LIST

Patent Literatures

PTL 1: Japanese Patent Application Laid-Open No. 2017-224053

SUMMARY OF INVENTION

Technical Problem

A system that is a target of security diagnosis is referred to as a system to be diagnosed. It is preferable to be able to present the analysis results for a system to be diagnosed to the security administrator so that an attack order, etc. can be easily understood.

Therefore, the purpose of the present invention is to provide an analysis system, analysis method, and analysis program that can present analysis results for a system to be diagnosed so that an attack order, etc. can be easily understood.

Solution to Problem

An analysis system according to the present invention includes a fact generation unit which generates a fact which is data representing a security situation of a system to be diagnosed, based on information regarding each device included in the system to be diagnosed; and an analysis unit which generates one or more pairs of a start point fact which is a fact representing possibility of an attack in the device that is a start point and an end point fact which is a fact representing possibility of an attack in the device that is an end point, analyzes, for each pair, whether or not it is possible to derive the end point fact from the start point fact, based on facts representing states of the devices generated based on information regarding the device that is the start point and information regarding the device that is the end point, the start point fact, and one or more analysis rules for analyzing the attack, and generates an attack scenario which is information that represents a transition relationship of a combination of the device, an attack state, and privileges that can correspond to the attack state according to the start point fact and the end point fact, in a case where it is possible to derive the end point fact from the start point fact.

An analysis system according to the present invention includes an input unit to which an attack graph regarding a system to be diagnosed is input, and an analysis unit which searches for a pair of a combination node indicating a combination of a device, an attack state, and privileges, and a combination node next to the combination node, and generates an attack scenario which is information that represents a transition relationship of a combination of the device, the attack state, and the privileges that can correspond to the attack state, for each pair of the combination nodes.

In an analysis method according to the present invention, one or more computers generate a fact which is data representing a security situation of a system to be diagnosed, based on information regarding each device included in the system to be diagnosed; and generate one or more pairs of a start point fact which is a fact representing possibility of an attack in the device that is a start point and an end point fact which is a fact representing possibility of an attack in the device that is an end point, analyze, for each pair, whether or not it is possible to derive the end point fact from the start point fact, based on facts representing states of the devices generated based on information regarding the device that is the start point and information regarding the device that is the end point, the start point fact, and one or more analysis rules for analyzing the attack, and generate an attack scenario which is information that represents a transition relationship of a combination of the device, an attack state, and privileges that can correspond to the attack state according to the start point fact and the end point fact, in a case where it is possible to derive the end point fact from the start point fact.

In an analysis method according to the present invention, one or more computers receive an input of an attack graph regarding a system to be diagnosed, and search for a pair of a combination node indicating a combination of a device, an attack state, and privileges, and a combination node next to the combination node, and generate an attack scenario which is information that represents a transition relationship of a combination of the device, the attack state, and the privileges that can correspond to the attack state, for each pair of the combination nodes.

An analysis program according to the present invention causes a computer to execute: a fact generation process of generating a fact which is data representing a security situation of a system to be diagnosed, based on information regarding each device included in the system to be diagnosed; and an analysis process of generating one or more pairs of a start point fact which is a fact representing possibility of an attack in the device that is a start point and an end point fact which is a fact representing possibility of an attack in the device that is an end point, analyzing, for each pair, whether or not it is possible to derive the end point fact from the start point fact, based on facts representing states of the devices generated based on information regarding the device that is the start point and information regarding the device that is the end point, the start point fact, and one or more analysis rules for analyzing the attack, and generating an attack scenario which is information that represents a transition relationship of a combination of the device, an attack state, and privileges that can correspond to the attack state according to the start point fact and the end point fact, in a case where it is possible to derive the end point fact from the start point fact.

An analysis program according to the present invention causes a computer to execute: a receiving input process of receiving an input of an attack graph regarding a system to be diagnosed, and an analysis process of searching for a pair of a combination node indicating a combination of a device, an attack state, and privileges, and a combination node next to the combination node, and generating an attack scenario which is information that represents a transition relationship of a combination of the device, the attack state, and the privileges that can correspond to the attack state, for each pair of the combination nodes.

Advantageous Effects of Invention

According to the present invention, it is possible to present analysis results for a system to be diagnosed so that an attack order, etc. can be easily understood.

BRIEF DESCRIPTION OF DRAWINGS

FIG. 4 It depicts a diagram showing an example of an analysis rule.

FIG. 14 It depicts a schematic diagram showing an example of an attack pattern.

FIG. 15 It depicts a schematic diagram showing an example of a pattern table.

FIG. 16 It depicts a schematic diagram showing that facts that are the end points derived from a fact that is the start point are identical, but the analysis rules used to derive the facts that are the end points are different.

FIG. 17 It depicts a diagram showing an example of an analysis rule.

FIG. 18 It depicts a diagram showing an example of an analysis rule.

DESCRIPTION OF EMBODIMENTS

Figure 1:
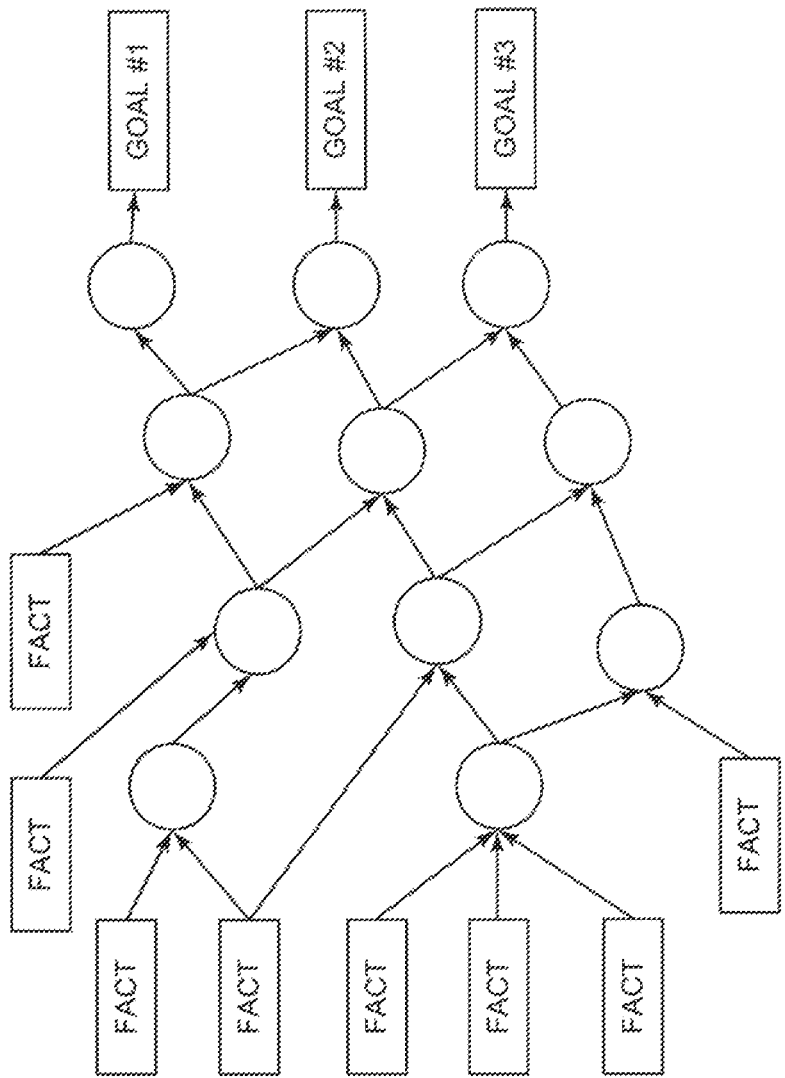
FIG. 1 It depicts a schematic diagram showing an example of a general attack graph.

The analysis system described in each of the following example embodiments is a system for analyzing cyber attacks on the system to be diagnosed (assessed). As described above, a system to be diagnosed is a system that is a target of security diagnosis. Examples of systems to be diagnosed include an information technology (IT) system in a company and so-called operational technology (OT) system for controlling a factory, a plant or the like. However, the systems to be diagnosed are not limited to these systems. A system in which multiple devices are connected through a communication network can be a system to be diagnosed.

Each device included in the system to be diagnosed is connected through a communication network. Examples of devices included in the system to be diagnosed include personal computers, servers, switches, routers, machine tools installed in factories, and control devices for machine tools. However, the devices are not limited to the above examples. The devices may be physical devices or virtual devices.

A way to analyze attacks on the system to be diagnosed is to use an attack graph. An attack graph is a graph that can show the state of a device, such as the presence or the absence of vulnerability, and a relationship between an attack that can be executed on one device and an attack that can be executed on other devices based on the attack that can be executed on the one device. An attack graph is represented as a directed graph where any state (device, network, vulnerability, security settings, etc.), that may relate to security, is defined as a fact, the states are nodes, and the relationships between facts are edges.

Here, a fact is data that represents the security situation of the system to be diagnosed. As a more detailed example, a fact represents some state of the system to be diagnosed, or a device included in the system to be diagnosed, that may relate to security mainly. As another detailed example, a fact represents an attack that may be performed on each device included in the system to be diagnosed. In this case, the fact is expressed in the form of a combination of a device and an attack state, or a combination of a device, an attack state and privileges, as described below. In the analysis of attack, it is assumed that some attacks can be carried out on the devices included in the system to be diagnosed. Such an assumption may be treated as a fact.

The fact can be determined from information obtained from each device included in the system to be diagnosed. In addition, a rule for deriving a new fact from existing facts (hereinafter, referred to as an analysis rule) can be used to derive a new fact from one or more existing facts. For example, a new fact can be derived based on the facts determined from information obtained from each device in the system to be diagnosed, using the analysis rule. Furthermore, another new fact can be derived based on the facts determined from information obtained from each device and a newly obtained fact. This process is repeated until no new fact can be derived from the analysis rule. Then, an attack graph can be generated by setting each fact to a node, connecting each node corresponding to a fact with an edge extending from a node corresponding to the fact that is the basis of a newly obtained fact to the node corresponding to the newly obtained fact.

FIG. 1 a schematic diagram showing an example of a general attack graph obtained in this way. In FIG. 1, nodes represented by rectangles labeled "FACT" represent the facts determined from information obtained from each device. In FIG. 1, nodes represented by circles and nodes represented by rectangles labeled "GOAL" represent facts that are newly derived using the analysis rule. The "GOAL"s in FIG. 1 are a part of the newly derived facts using the analysis rule, and represent the facts that are end points of fact derivations using the analysis rule.

The following analysis system of each example embodiment below generates an attack scenario which is information that represents a transition relationship of a combination of a device, an attack state, and privileges that can correspond to the attack state.

The analysis system of each example embodiment of the invention generates one or more pairs of a fact that is the start point and a fact that is the end point, and generates an attack scenario for each pair. Note that there may be some pairs for which no attack scenario is generated.

Hereinafter, example embodiments of the present invention will be described with reference to the drawings.

Example Embodiment 1

Figure 2:
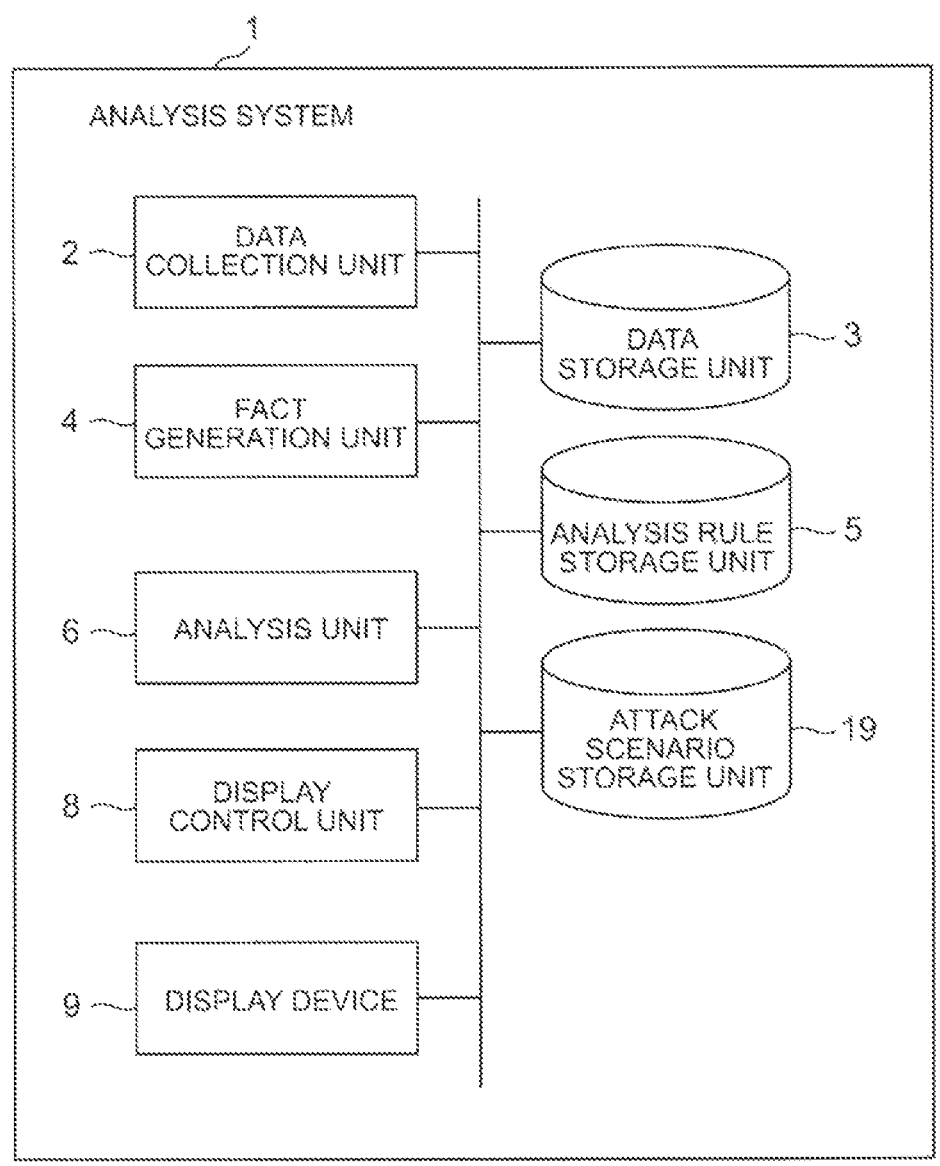
FIG. 2 It depicts a block diagram showing an example of an analysis system of the first example embodiment of the present invention.

FIG. 2 is a block diagram showing an example of the analysis system of the first example embodiment of the present invention. The analysis system 1 of the first example embodiment comprises a data collection unit 2, a data storage unit 3, a fact generation unit 4, an analysis rule storage unit 5, an analysis unit 6, an attack scenario storage unit 19, a display control unit 8, and a display device 9.

The data collection unit 2 collects information regarding each device included in the system to be diagnosed.

The information regarding the device is information that can be related to security of the device. Examples of information regarding the device that the data collection unit 2 collects include an operating system (OS) installed on the device and its version information, hardware configuration information installed on the device, software installed on the device and its version information, information on the communication data exchanged between the device and other devices and the communication protocol used to exchange the communication data, information on the status of ports of the device (which ports are open) and so on, for example. The communication data includes information on a source and a destination of the communication data. The data collection unit 2 collects the above information. However, examples of the information collected by the data collection unit 2 are not limited to the above examples. The data collection unit 2 may also collect other information that may be relevant to the security of the device as information regarding the device.

The data collection unit 2 may collect information regarding the devices directly from each device included in the system to be diagnosed. In this case, the analysis system 1 is connected to each device through a communication network, and the data collection unit 2 can collect information from each device through the communication network.

Alternatively, the data collection unit 2 may obtain information regarding each device from an information collection server that collects information regarding each device. In this case, the analysis system 1 is connected to the information collection server through a communication network, and the data collection unit 2 can collect information regarding each device from the information collection server through the communication network.

When each device has an agent, the data collection unit 2 may collect information regarding each device through the agent. In other words, the data collection unit 2 may obtain information regarding each device from the information collection server that collects information regarding each device through the agent.

Each agent installed in each device may transmit information regarding the device to the information collection server, and the data collection unit 2 may collect information regarding each device included in the system to be diagnosed from that information collection server. In this case, for example, the analysis system 1 is connected to the information collection server through a communication network, and the data collection unit 2 may collect information regarding each device from that information collection server through the communication network.

When the data collection unit 2 collects information regarding each device included in the system to be diagnosed, the data collection unit 2 stores the information in the data storage unit 3.

The data storage unit 3 is a storage device that stores the information regarding each device collected by the data collection unit 2.

The fact generation unit 4 generates one or more facts based on the information regarding each device collected by the data collection unit 2. As already explained, the fact represents the security situation of the system to be diagnosed. The fact generated by the fact generation unit 4 represents some state mainly related to security of one or more devices included in the system to be diagnosed, derived from the specific information obtained from each device.

For example, the fact generation unit 4 generates one or more facts by referring to the rule for generating facts that include one or more templates representing the facts to be generated, which have been prepared in advance, and determining whether or not the information regarding each device matches the respective template. Information regarding each device is applied to the parameters of the generated facts as appropriate.

Figure 3:
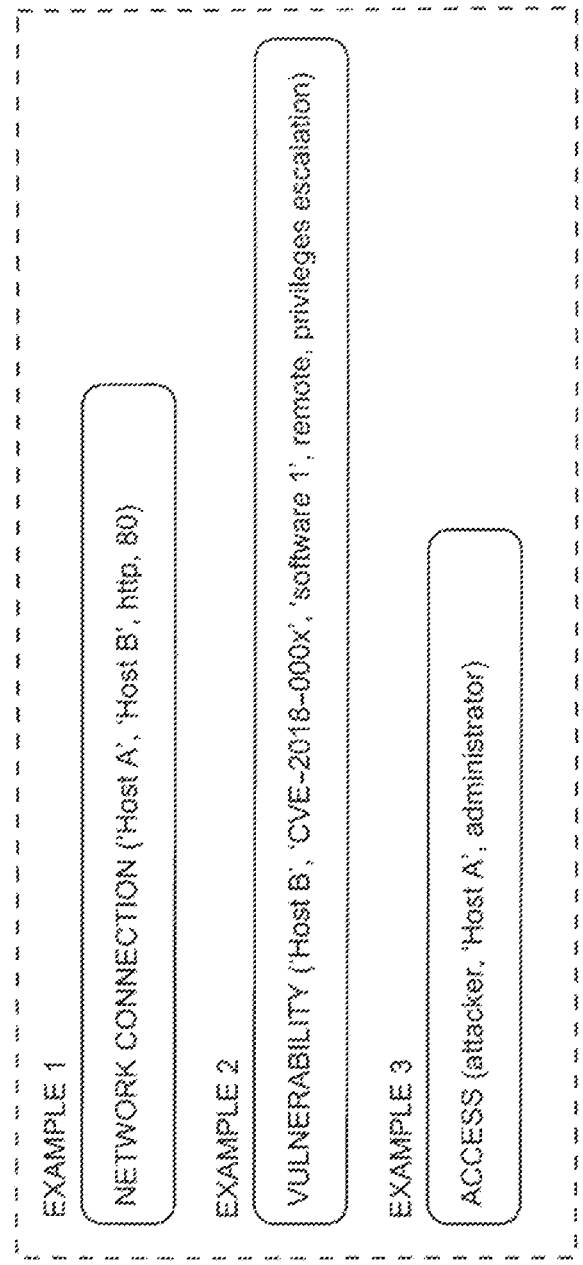
FIG. 3 It depicts a diagram showing an example of a generated fact.

FIG. 3 shows an example of the facts that are generated. Although three facts are shown in FIG. 3, the facts are not limited to the three shown in FIG. 3. The facts necessary for the processing in the analysis unit 6 should be generated accordingly.

In FIG. 3, the parameters shown in single quotation marks are individual specific information regarding the devices in the system to be diagnosed. For example, 'Host A' and 'Host B' in the example shown in FIG. 3 are specific device IDs. The device ID is information that identifies each of the devices included in the diagnostic target. The parameter 'software 1' in the example shown in FIG. 3 is the specific software name installed in the device, and 'CVE-2018-000x' is the identification information of the specific vulnerability associated with the software. In this case, an identification information such as the common vulnerability identifier CVE (Common Vulnerabilities and Exposures) numbered by a security-related organization may be used as the identification information. The fact parameter may also include a parameter that represents a wildcard.

The fact shown as Example 1 in FIG. 3 represents the matter "HTTP (HyperText Transfer Protocol) communication from a device 'Host A' to a device 'Host B' is possible using TCP (Transmission Control Protocol) port 80."

The fact shown as Example 2 in FIG. 3 represents the matter "'software 1' on the device 'Host B' has vulnerability 'CVE-2018-000x', and the administrative privileges can be obtained by attacking the vulnerability from a remote location."

The fact shown as Example 3 in FIG. 3 represents the matter "the attacker has administrative privileges in device 'Host A'."

The description format of the fact is not limited to the example shown in FIG. 3, but can be in other formats as long as the processing in the analysis unit 6 can be performed.

The analysis rule storage unit 5 is a storage device that stores analysis rules. An analysis rule is a rule for deriving a new fact from an existing fact. The fact derived using the analysis rule is mainly a fact that represents an attack that can be performed on each device included in the system to be diagnosed. The analysis rule storage unit 5 stores one or more analysis rules according to the system to be diagnosed.

FIG. 4 shows an example of an analysis rule. The analysis rule includes at least an element that represents the new fact to be derived and an element that corresponds to the condition. In other words, the analysis rule indicates that a new fact will be derived if there is a fact that matches the condition. In the example shown in FIG. 4, the element in the first line is the element that represents the new fact to be derived. In addition, each element from the second line to the fourth line is an element that corresponds to a condition. In the analysis rule shown in FIG. 4, the new fact represented in the first line is derived when there is a fact that matches all three conditions. The analysis rule may also include an element representing a label that is uniquely defined for that analysis rule. In the example shown in FIG. 4, the element in line 5 is the element that represents the label uniquely defined for the analysis rule. The element in the fifth line represents that the label of the analysis rule shown in FIG. 4 is "exec01".

In FIG. 4, the parameters enclosed in single quotation marks are individual specific information regarding the device in the system to be diagnosed. For example, 'software 1' in the third line of the condition is the name of the specific software installed in the device. In other words, the condition in the third line is a condition related to the software called 'software 1' installed in the device. In a fact to match a condition that includes such an individual specific parameter, information corresponding to the parameter should be included. In other words, the fact that matches the condition in line 3 is a fact that is associated with the software named 'software 1' installed on the device.

The analysis rules shown in FIG. 4 may also include fixed values, unlike the variables described below. For example, "attacker," "administrative privileges," "http," 80"," "remote," "privileges escalation," and "administrator" shown in FIG. 4 are fixed values. For a fact to match a condition that includes a fixed value as a parameter, information corresponding to that fixed value should be included in the premising fact.

In FIG. 4, parameters that begin with a capital letter are variables. The variable parameters mean that they may be changeable depending on the fact to be matched. In the example shown in FIG. 4, "SrcHost" and "DstHost" are variables. Various information included in the information collected from the device is assigned to the parameters as variables. In a single analysis rule, variables described by the same parameter are assigned to a common value. For example, a common concrete device ID is assigned to the variable "SrcHost" described in the second and fourth lines of FIG. 4. Similarly, a common concrete device ID is assigned to the variable "DstHost" described in the second and third lines of FIG. 4.

In the example shown in FIG. 4, the "CVEID" in the third line represents a wildcard for the vulnerability identification information. In this way, a parameter representing the wildcard may be included in the analysis rule. If a fact is true regardless of the information regarding the device, at least part of the fact may include a parameter representing a wildcard. A parameter representing a wildcard indicates that the information that can be anything is assigned to the parameter.

In the analysis rule shown in FIG. 4, the same information regarding the device is assigned to the same variables included in the conditions. In other words, in the analysis rule shown in FIG. 4, the same information regarding the device is assigned for each of the "SrcHost" and "DstHost" parameters. In the example shown in FIG. 4, if the information regarding the device is assigned to the variables as described above, and when there are facts that matches each of the conditions, a new fact represented in the first line is derived. The new fact represented in the first row is the fact that the information regarding the device is assigned to the variable.

The description format of the analysis rules is not limited to the example shown in FIG. 4.

The analysis unit 6 generates an attack scenario for a pair which is possible to derive a fact that is the end point from a fact that is the start point among one or more pairs of a fact that is the start point and a fact that is the end point. An attack scenario is information that represents a transition relationship of a combination of a device, an attack state, and privileges that can correspond to the attack state. As an example, the analysis unit 6 analyzes whether or not it is possible to derive a fact that is the end point from a fact that is the start point. When the fact that is the end point can be derived from the fact that is the start point, the analysis unit 6 generates an attack scenario. The analysis unit 6 analyzes whether or not it is possible to derive the fact that is the end point from the fact that is the start point using the fact generated from the information regarding the device that is the start point and the device that is the end point, the fact that is the start point, and the analysis rule stored in the analysis rule storage unit 5. In this analysis, the analysis unit 6 does not use facts generated from information regarding devices that do not correspond to either the device that is the start point or the device that is the end point. When it is possible to derive a fact that is the end point from a fact that is the start point, the analysis unit 6 generates an attack scenario.

The fact that is the start point may be referred to simply as a start point fact. Similarly, the fact that is the end point may be referred to simply as an end point fact.

Each of the fact that is the start point and the fact that is the end point is usually a fact (a fact that represents the possibility of an attack) that represents an attack that can be performed on each device in the system to be diagnosed. In other words, the ability to derive a fact that is the end point from a fact that is the start point indicates that if some attack is possible on the device that is the start point, another attack is possible on the device that is the end point. The inability to derive the fact that is the end point from the fact that is the start point indicates that even if some attack is possible on the device that is the start point, another attack represented by the fact that is the end point cannot be executed on the device fact that is the end point.

An example of an operation to analyze whether or not it is possible to derive a fact that is the end point from a fact that is the start point will be described.

The analysis unit 6 generates one or more pairs of a fact that is the start point of an attack graph and a fact that is the end point of the attack graph. The fact that is the start point and the fact that is the end point are facts that represent attacks that can take place on the device that is the start point and the device that is the end point, respectively.

The analysis unit 6 analyzes whether or not it is possible to derive the fact that is the end point from the fact that is the start point, based on the fact generated from the information regarding the device that is the start point and the device that is the end point, the fact that is the start point, and the analysis rule stored in the analysis rule storage unit 5, for each pair of the fact that is the start point of the attack graph and the fact that is the end point of the attack graph. In this analysis, the analysis unit 6 does not use facts generated from information regarding devices that do not correspond to either the device that is the start point or the device that is the end point.

The fact that is the start point of the attack graph and the fact that is the end point of the attack graph will be described.

There are multiple types of attacks, and the attacks that a device may be subjected to vary depending on the vulnerability the which device has. Therefore, in the example embodiments of the present invention, the state of a device that may be attacked by vulnerability is defined as the attack state. For example, as the attack state, "a state in which code can be executed (hereinafter, referred to as "arbitrary code execution")", "a state in which data can be tampered with (hereinafter, referred to as "data tampering"), "a state in which files can be accessed (hereinafter, referred to as "file accessible")", "a state in which account information has held (hereinafter, referred to as "account holding")", "a state in which a DoS (Denial of Service) attack can be carried out (hereinafter, referred to as "dos")", etc. are given. In the present example embodiment, there are five attack states "arbitrary code execution", "data tampering", "file accessible", "account holding", and "dos" as an example. However, the attack states are not limited to the above five types. Other types of attack states may be given depending on the attacks that may occur in the system to be diagnosed. An attack state that includes multiple attack states may also be defined. For example, an attack state called "all" may be defined as a state that includes all of the attack states "arbitrary code execution", "data tampering", "file accessible", and "account holding".

The analysis unit 6 generates a combination of one of the device IDs of devices included in the system to be diagnosed, one of the multiple predetermined attack states, and one of the privileges that can correspond to the attack states as the fact that is the start point of the attack graph.

Similarly, the analysis unit 6 generates a combination of one of the device IDs of devices included in the system to be diagnosed, one of the multiple predetermined attack states, and one of the privileges that can correspond to the attack states as the fact that is the end point of the attack graph.

Here, "privileges" includes privileges when the attack indicated by the attack state is performed. In this case, the privilege is, for example, either administrative privileges or general privileges. In addition, "privileges" may include the matter that privilege is not relevant when the attack indicated by the attack state is performed (hereinafter, referred to as "no relevant privileges"). Therefore, the predetermined multiple types of privileges are, as an example, "administrative privileges", "general privileges", and "no relevant privileges".

The combination of attack state and privileges can be determined according to the specific content of the attack state. For example, each of the attacks indicated by "arbitrary code execution," "data tampering," "file accessible," and "account holding" can be performed under some privileges, such as administrative or general privileges. Therefore, for each attack state of "arbitrary code execution," "data tampering," "file accessibility," and "account holding" appropriate privileges such as "administrative privileges" or "general privileges" can be combined, depending on the specifics of each attack state. A DoS attack is not related to administrative privileges, general privileges, or other privileges. Therefore, the attack condition "dos" will be combined with "no relevant privileges".

Under such a combination of attack state and privileges, the analysis unit 6 generates a combination of a device corresponding to one of the devices included in the system to be diagnosed, one of the multiple types of attack states, and one of the privileges that can correspond to the attack state, as the fact that is the start point of the attack graph under such a combination of attack states and privileges. Similarly, the analysis unit 6 generates a combination of a device corresponding to one of the devices included in the system to be diagnosed, one of the multiple types of attack states, and one of the multiple types of privileges that can correspond to the attack state, as a fact that is the end point of the attack graph under such a combination of attack states and privileges.

In this way, the combination of "device, attack state, and privileges" is treated as a fact that is the start point of the attack graph or a fact that is the end point of the attack graph. The device included in a fact is represented by a device ID, for example. In other words, each of a fact that is the start point and a fact that is the end point is a fact that indicates possibility under the attack represented by the attack state in the device represented by the device ID.

Furthermore, the analysis unit 6 determines a pair of a fact (a combination of "device, attack state, and privileges") that is the start point of the attack graph and a fact (a combination of "device, attack state, and privileges") that is the end point of the attack graph. In this case, the analysis unit 6 may exhaustively determine all pairs of facts that are the start points and facts that are the end points in the system to be diagnosed, or some of all pairs. In the case of defining some of all pairs, the analysis unit 6 may determine a pair of the fact that is the start point and the fact that is the end point based on some of the devices included in the system to be diagnosed, such as devices included in a specific subnet in the system to be diagnosed. That is, when the analysis unit 6 generates the fact that is the start point and the fact that is the end point based on some of the devices included in the system to be diagnosed, the analysis unit 6 may regard the devices included in the same subnet of the system to be diagnosed as some of the devices. The analysis unit 6 may also determine the pair of the fact that is the start point and the fact that is the end point by excluding pairs of devices that need to go through other devices for communication, i.e., pairs of devices that cannot communicate directly. In other words, when the analysis unit 6 generates the fact that is the start point and the fact that is the end point based on some of the devices included in the system to be diagnosed, the analysis unit 6 may regard the devices that can communicate directly as some of the devices.

In this case, the analysis unit 6 may determine combinations of the devices that are the start points and the devices that are the end points, and under each combination of devices, determine the fact (a combination of "device, attack state, and privileges") that is the start point and the fact (a combination of "device, attack state, and privileges") that is the end point.

The device included in the fact that is the start point and the device included in the fact that is the end point may be the same device. In this case, the analysis unit 6 can also analyze whether it is possible to reach from one attack state of a device to another attack state, in other words, if a certain attack is possible on a device, whether another attack is possible on the device.

After defining one or more pairs of the fact that is the start point and the fact that is the end point as described above, the analysis unit 6 analyzes, for each pair, whether or not it is possible to derive the fact that is the end point from the fact that is the start point, based on the fact representing the state of each device generated from the information regarding the device that is the start point and the information regarding the device that is the end point, the fact that is the start point, and one or more predetermined analysis rules. In this case, the analysis unit 6 can apply an inference algorithm based on the analysis rule stored in the analysis rule storage unit 5, for example. The device that is the start point is a device indicated by the device ID included in the fact that is the start point, and the device that is the end point is a device indicated by the device ID included in the fact that is the end point. Accordingly, for example, when the device ID in the fact that is the start point is 'Host A' and the device ID in the fact that is the end point is 'Host B', the analysis unit 6 analyzes whether or not it is possible to derive the fact that is the end point based on facts representing states of 'Host A' and 'Host B' generated from information regarding device 'Host A' and information regarding device 'Host B'. Therefore, the analysis unit 6 can analyze whether or not it is possible to derive a fact that is the end point from a fact that is the start point for the focused pair, without deriving facts related to devices other than the device that is the start point and the device that is the end point or deriving the same facts repeatedly. In other words, by restricting facts to be referenced as described above, the analysis unit 6 can analyze whether or not it is possible to derive a fact that is the end point from a fact that is the start point without deriving redundant facts.

At the time of starting the analysis of whether or not it is possible to derive a fact that is the end point by focusing on a single pair, the analysis unit 6 regards a fact generated from the information regarding the device that is the start point and the information regarding the device that is the end point, and the fact that is the start point as the existing facts.

The analysis unit 6 does not include facts generated by the fact generation unit 4 from information regarding devices other than the device that is the start point and device that is the end point to the existing facts. The analysis unit 6 determines whether or not a fact that matches the condition of the analysis rule is included in the existing facts. Then, the analysis unit 6 derives a new fact based on the analysis rules when the respective facts that match the respective conditions included in the analysis rule exist in the existing facts. The analysis unit 6 adds the derived new fact to the existing facts. The analysis unit 6 repeats this operation. The analysis unit 6 determines that it is possible to derive a fact that is the end point from a fact that is the start point when the derived new fact matches the fact that is the end point in the focused pair.

Hereinafter, a more detailed explanation of an example of the operation of the analysis unit 6 to derive new facts will be described, referring to the analysis rule illustrated in FIG. 4 as an example. The analysis unit 6 determines whether or not there is a fact that matches the condition by contrasting each of the conditions included in the analysis rule with each of the existing facts obtained at that point in time. For the fixed value parameters among the conditions included in the analysis rule, the analysis unit 6 determines whether or not a fact matching the condition exists in the existing facts by determining whether or not the fixed value parameter included in the condition matches the corresponding fixed value in the existing facts. For the parameters of the variables, the analysis unit 6 assigns the value included in the existing fact to the condition as it is. Then, the analysis unit 6 derives a new fact if the fact that matches the condition is included in the existing facts.

For example, assume that the existing facts include the three facts illustrated in FIG. 3. Then, assume that the analysis unit 6 derives a new fact using the analysis rule illustrated in FIG. 4. In this case, the fixed value parameters included in each condition of the analysis rule shown in FIG. 4 match the fixed value parameters included in the fact shown in FIG. 3. Therefore, in this case, the analysis unit 6 assign 'Host B' to the variable 'DstHost' in the first line shown in FIG. 4 to derive "arbitrary code execution (attacker, 'Host B', administrative privileges)" as a new fact. Then, the analysis unit 6 adds the new fact to the existing facts. This new fact represents the matter "The attacker is able to execute code on device 'Host B' with administrative privileges". In other words, from the three facts illustrated in FIG. 3, the matter "The attacker is able to execute code on device 'Host B' with administrative privileges" is derived.

When the conditions included in the analysis rule do not match the existing facts, the analysis unit 6 will not derive a new fact based on the analysis rule. This means that the fact represented by the analysis rule will not be derived when the existing fact is premised.

The analysis unit 6 performs the same process for each analysis rule.

The analysis unit 6 repeats derivation of new facts until a new fact corresponds to the fact that is the end point in the pair that is being focused on. If the fact that is the end point in the focused pair is not obtained even after repeating the derivation of new facts until no new fact can be derived, the analysis unit 6 determines that the fact that is the end point cannot be derived from the fact that is the start point for the focused pair. This corresponds to the matter where no attack occurs on the device that is the end point due to the attack state on the device that is the start point.

The analysis unit 6 may use other methods to analyze whether it is possible to derive the fact that is the end point from the fact that is the start point. In this case, when the analysis unit 6 is able to determine that the fact that is the end point cannot be derived from the fact that is the start point, the analysis unit 6 may terminate the analysis for the pair.

When the analysis unit 6 determines that it is possible to derive a fact that is the end point from the fact that is the start point, the analysis unit 6 generates an attack scenario for the pair of facts. In this case, the analysis unit 6 generates an attack scenario according to the fact that is the start point and the fact that is the end point. More specifically, for each pair (a pair of the fact that is the start point and the fact that is the end point) determined that it is possible to derive a fact that is the end point from the fact that is the start point, the analysis unit 6 generates information that indicates a transition from the "combination of a device, an attack state, and privileges" corresponding to a fact that is the start point, to the "combination of a device, an attack state, and privileges" corresponding to a fact that is the end point, as an attack scenario.

The analysis unit 6 stores the generated attack scenario in the attack scenario storage unit 19. The attack scenario storage unit 19 is a storage device that stores the attack scenarios.

The display control unit 8 displays each attack scenario generated by the analysis unit 6 on the display device 9. The display control unit 8 may read each attack scenario from the attack scenario storage unit 19 and display each attack scenario on the display device 9.

The display device 9 is a device that displays information, and can be a general display device. When the analysis system 1 exists in the cloud, the display device 9 may be a display device of a terminal connected to the cloud.

An example of an operation in which the display control unit 8 displays an attack scenario will be described. As described above, for each pair (a pair of the fact that is the start point and the fact that is the end point) determined that it is possible to derive the fact that is the end point from the fact that is the start point, the analysis unit 6 generates information that indicates a transition from the "combination of a device, an attack state, and privileges" corresponding to a fact that is the start point, to the "combination of a device, an attack state, and privileges" corresponding to a fact that is the end point, as an attack scenario.

When displaying each attack scenario, the display control unit 8 displays a second icon representing privileges in a first icon representing a device, and displays a third icon representing an attack state in the second icon, for a fact that is the start point. Similarly, the display control unit 8 also displays a second icon representing privileges in a first icon representing a device, and displays a third icon representing an attack state in the second icon, for a fact that is the end point. The display control unit 8 then displays an edge extending from the third icon corresponding to a fact that is the start point to the third icon corresponding to a fact that is the end point.

However, when the device in a fact that is the start point and the device in a fact that is the end point are common, the first icon is common. Similarly, when the device and privileges in a fact that is the start point and the device and privileges in a fact that is the end point are common, the first icon is common and the second icon is also common.

In a predetermined case, the display control unit 8 omits displaying the second icon and displays the third icon in the first icon. The above predetermined case is the case where the privilege is "no relevant privileges" in the present example embodiment. In the present example embodiment, "no relevant privileges" corresponds to the attack state of "dos". Therefore, the third icon representing "dos" is displayed without the second icon.

Figure 5:
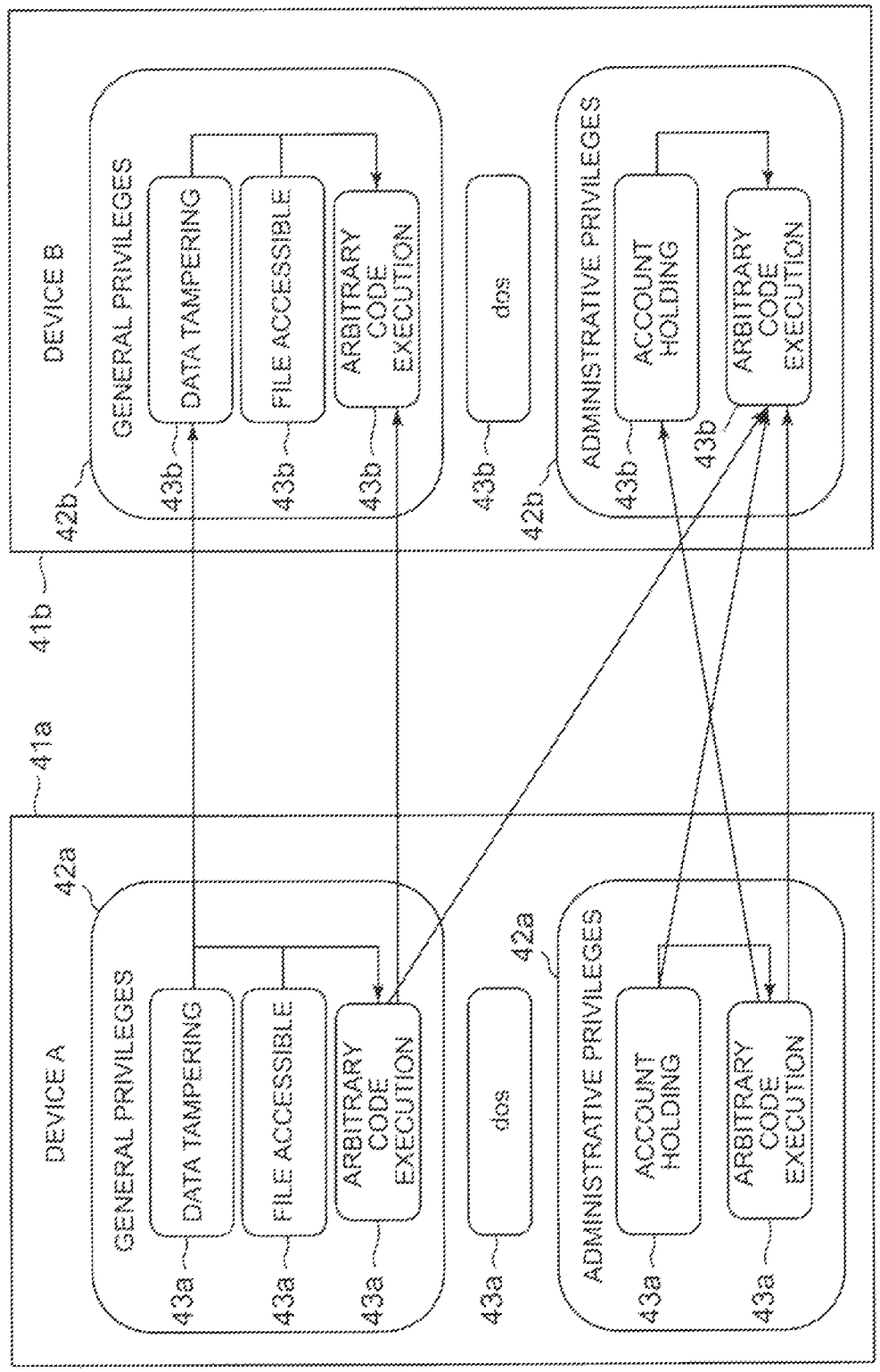
FIG. 5 It depicts a schematic diagram showing an example of the display of an attack scenario.

FIG. 5 is a schematic diagram showing an example of the display of an attack scenario as described above. FIG. 5 shows an example of the display of multiple attack scenarios in two devices A and B. In this example, as shown in FIG. 5, the display control unit 8 displays two first icons 41 representing devices A and B. Then, the display control unit 8 displays second icons 42 representing general privileges and administrative privileges in the first icon 41. Furthermore, the display control unit 8 displays third icons 43 representing various attack states such as "arbitrary code execution" in the second icon 42. However, as described above, when the privilege is "no relevant privileges", the display control unit 8 omits displaying the second icon 42. Therefore, the display control unit 8 displays the third icon 43 representing "dos" in the first icon 41 without the second icon 42. In addition, the display control unit 8 displays an edge extending from the third icon 43 corresponding to a fact that is the start point to the third icon 43 corresponding to a fact that is the end point. Hereinafter, in order to make the description easier to understand, the sign of each icon on the device A side will be described by adding a subscript "a", and the sign of each icon on the device B side will be described by adding a subscript "b".

For example, in the example shown in FIG. 5, in the first icon 41*a* representing the device A, the second icon 42*a* representing general privileges is displayed, and furthermore, in the second icon 42*a*, the third icon 43*a* representing "arbitrary code execution" is displayed.

Similarly, in the first icon 41*b* representing the device B, the second icon 42*b* representing administrative privileges is displayed, and furthermore, in the second icon 42*b*, the third icon 43*b* representing "arbitrary code execution" is displayed. And an edge extending from the above third icon 43*a* to the third icon 43*b* is displayed. This represents an attack scenario of transition from the combination "the device A, arbitrary code execution, general privileges" (fact) to the combination "the device B, arbitrary code execution, administrative privileges" (fact).

For example, in the example shown in FIG. 5, in the first icon 41*a* representing the device A, the second icon 42*a* representing general privileges is displayed, and furthermore, in the second icon 42*a*, the third icon 43*a* representing "file accessible" is displayed. Also, in the second icon 42*a*, another third icon 43*a* representing "arbitrary code execution" is displayed. And, an edge extending from the third icon 43*a* representing "file accessible" to another third icon 43*a* representing "arbitrary code execution" is displayed. This represents an attack scenario of transition from the combination (fact) "the device A, file accessible, general privileges" to the combination (fact) "the device A, arbitrary code execution, general privileges". In this attack scenario, the device in the fact that is the start point and the device in the fact that is the end point are common as "the device A". In addition, the privileges in the fact that is the start point and the privileges in the fact that is the end point are common as "general privileges". Therefore, in this example, the second icon 42*a* and the first icon 41*a* including the third icon 43*a* representing "file accessible" are common with the second icon 42*a* and the first icon 41*a* including the third icon 43*a* representing "arbitrary code execution".

In addition, assume that an end point in a certain combination of a fact that is a start point and a fact that is an end point (referred to as combination P) matches a start point in another combination of a fact that is a start point and a fact that is an end point (referred to as combination Q). In this case, the display control unit 8 displays both the edge reaching the third icon 43 corresponding to the end point in the combination P and the start point in the combination Q (both match), and the edge extending from the third icon 43. For example, in the example shown in FIG. 5, focusing on the third icon 43*b* representing "account holding" displayed in the icon 41*b* representing the device B, both the edge reaching the third icon 43*b* representing "account holding" and the edge extending from the third icon 43*b* are displayed.

Figure 6:
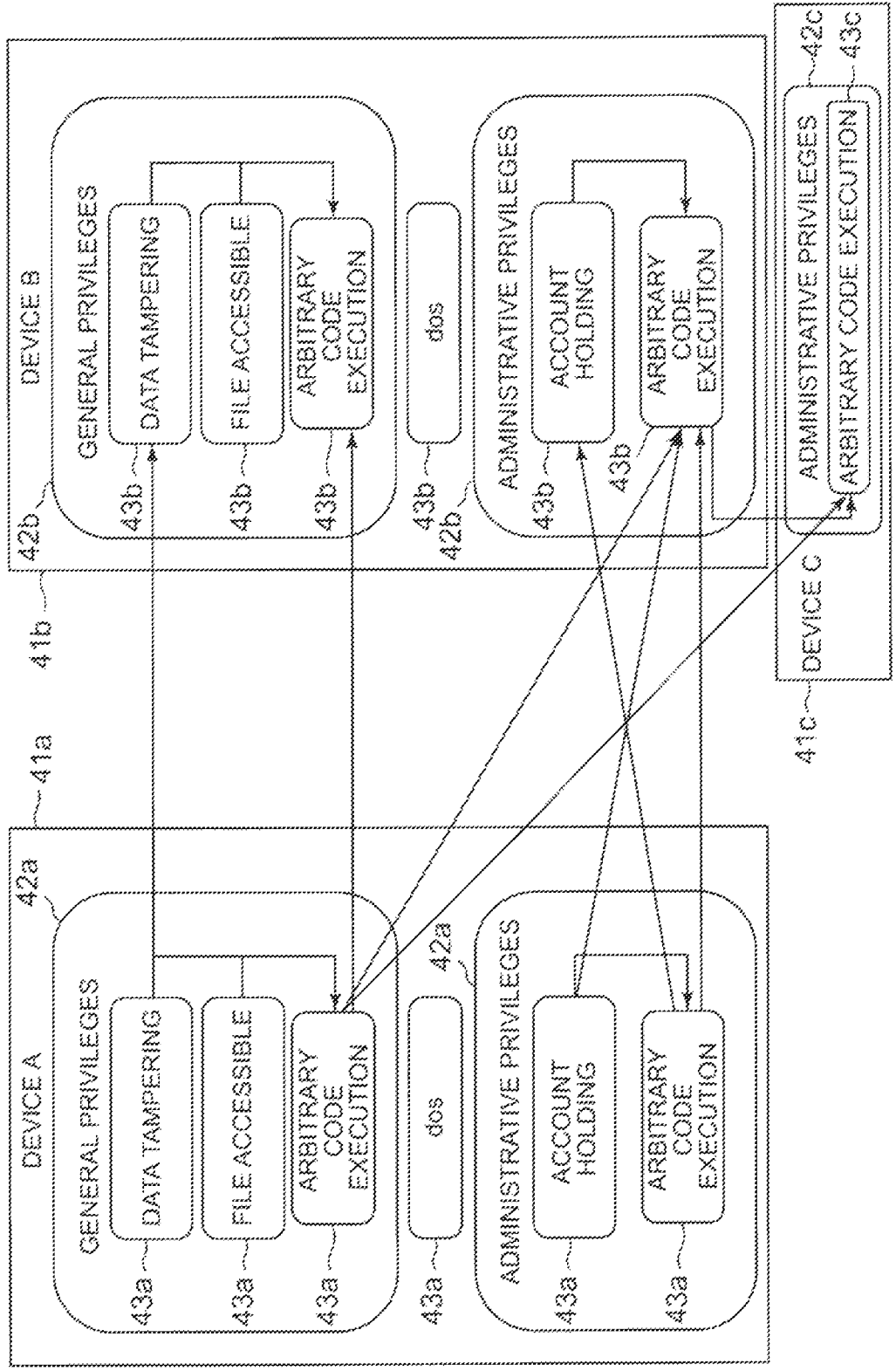
FIG. 6 It depicts a schematic diagram showing an example of the display of an attack scenario.

In the example shown in FIG. 5, an example of the display of multiple attack scenarios in two devices A and B is shown. The display control unit 8 may display multiple attack scenarios in three or more devices. FIG. 6 is a schematic diagram showing an example of the display of multiple attack scenarios in three devices A, B, and C. In FIG. 6, the subscript "c" is added to the sing of each icon on the device C side.

In the example shown in FIG. 6, it can be seen that there are a path that directly transitions from a combination of "the device A, arbitrary code execution, general privileges" to a combination of "the device C, arbitrary code execution, administrative privileges", and a path that transitions from a combination of "the device A, arbitrary code execution, general privileges" through a combination of "the device B, arbitrary code execution, administrative privileges" to a combination of "the device C, arbitrary code execution, administrative privileges". Thus, when transitioning from one combination to another, there may be a direct transition path and a path that transitions through one or more other devices (the device B in the above example), respectively.

The method of displaying the attack scenarios is not limited to the examples shown in FIGS. 5 and 6, and the display control unit 8 may display each attack scenario by a method different from the method described above.

The data collection unit 2 is realized by a CPU (Central Processing Unit) of a computer that operates according to an analysis program and a communication interface of the computer, for example. For example, the CPU can read the analysis program from a program storage medium such as a program storage device, etc. of the computer, and operate as the data collection unit 2 according to the analysis program and using the communication interface. In addition, the fact generation unit 4, the analysis unit 6 and the display control unit 8 can be realized by the CPU of the computer operating according to the analysis program, for example. For example, the CPU reads the analysis program from the program recording medium as described above, and operates as the fact generation unit 4, the analysis unit 6 and the display control unit 8 according to the analysis program. For example, the data storage unit 3, the analysis rule storage unit 5 and the attack scenario storage unit 19 are realized by the storage device provided by the computer.

Figure 7:
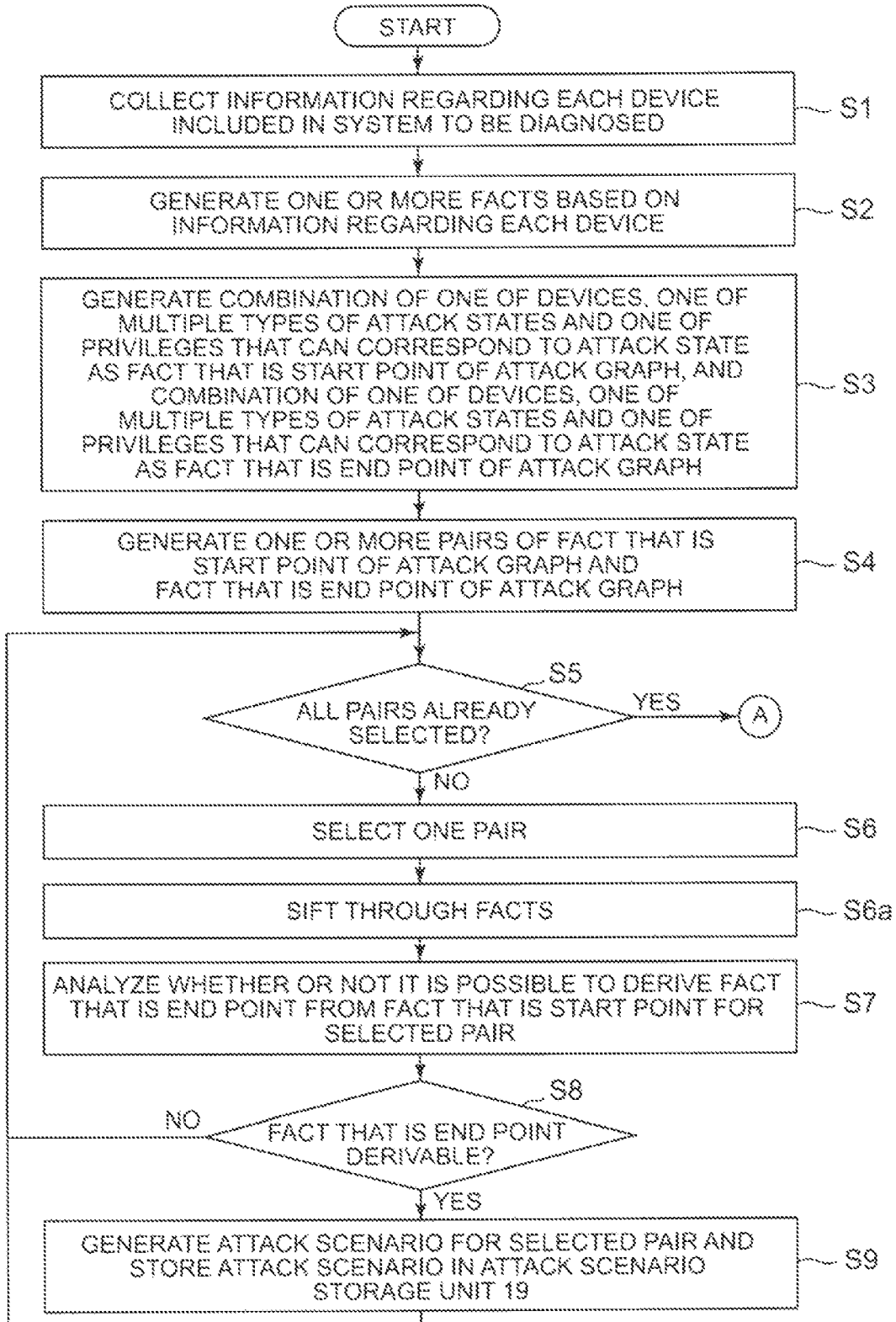
FIG. 7 It depicts a flowchart showing an example of the processing process of an analysis system of the first example embodiment of the present invention.
Figure 8:
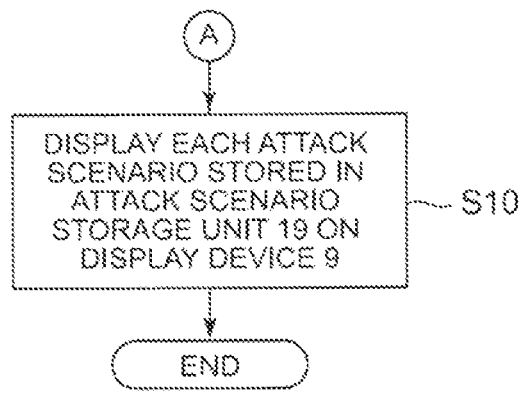
FIG. 8 It depicts a flowchart showing an example of the processing process of an analysis system of the first example embodiment of the present invention.

Next, the processing process will be described. FIGS. 7 and 8 are flowcharts showing an example of the processing process of the analysis system of the first example embodiment of the present invention. The matters already explained are omitted.

First, the data collection unit 2 collects information regarding each device included in the system to be diagnosed (step S1). The data collection unit 2 stores the collected data in the data storage unit 3.

Next, the fact generation unit 4 generates one or more facts based on the information regarding each device (step S2).

Next, the analysis unit 6 generates a combination of one of the devices, one of the multiple types of attack states, and one of the privileges that can correspond to the attack state as the fact that is the start point of the attack graph. Similarly, the analysis unit 6 generates a combination of one of the devices, one of the multiple types of attack states, and one of the privileges that can correspond to the attack state as a fact that is the end point of the attack graph (step S3).

Next, the analysis unit 6 generates one or more pairs of a fact that is the start point of the attack graph and a fact that is the end point of the attack graph (step S4).

Next, the analysis unit 6 determines whether all the pairs generated in step S4 have already been selected in step S6 (step S5). When there are unselected pairs (No in step S5), the process moves to step S6. When the process first moves to step S5 from step S4, not a pair has been selected. Therefore, in this case, the process moves to step S6.

In step S6, the analysis unit 6 selects one of the pairs generated in step S4 that has not yet been selected.

Following step S6, the analysis unit 6 sifts through the facts (step S6*a*). In step S6*a*, the analysis unit 6 selects facts to be used in the analysis of step S7, and does not select facts that are not used in the analysis of step S7. Specifically, the analysis unit 6 selects the fact generated from the information regarding the device that is the start point and the information regarding the device that is the end point, and the fact that is the start point. The analysis unit 6 does not select a fact generated based on information regarding a device that does not correspond to either the device that is the start point or the device that is the end point. The fact generated based on information regarding a device that does not correspond to either the device that is the start point or the device that is the end point is not used in the analysis of step S7.

After step S6*a*, the analysis unit 6 analyzes whether or not it is possible to derive the fact that is the end point from the fact that is the start point for the selected pair (step S7). At the start of step S7, the analysis unit 6 regards a fact generated from the information regarding the device that is the start point and the information regarding the device that is the end point, and the fact that is the start point (i.e., the fact selected in step S6*a*) as the existing facts (facts for reference). Then, when the analysis unit 6 derives a new fact based on the analysis rule, the analysis unit 6 adds the new fact to the above existing facts (facts for reference). The analysis unit 6 analyzes whether or not it is possible to derive the fact that is the end point by repeating the derivation of a new fact based on the existing facts (facts for reference) and the analysis rule. When the fact that is the end point in the selected pair cannot be obtained even after repeating the derivation of a new fact until no new facts can be derived, the analysis unit 6 determines that the fact that is the end point cannot be derived from the fact that is the start point.

When the fact that is the end point cannot be derived from the fact that is the start point (No of step S8), the analysis unit 6 repeats the process from step S5.

When the fact that is the end point can be derived from the fact that is the start point (Yes of step S8), the analysis unit 6 generates an attack scenario in the selected pair, and stores the attack scenario in the attack scenario storage unit 19 (step S9). In step S9, the analysis unit 6 generates information that indicates a transition from the "combination of a device, an attack state, and privileges" corresponding to a fact that is the start point, to the "combination of a device, an attack state, and privileges" corresponding to a fact that is the end point, as an attack scenario, for the selected pair.

The analysis unit 6 then stores the attack scenario in the attack scenario storage unit 19.

After step S9, the analysis unit 6 repeats the process from step S5.

When the analysis unit 6 determines that all the pairs generated in step S4 have already been selected in step S6 (Yes of step S5), the display control unit 8 reads each attack scenario stored in the attack scenario storage unit 19 and displays each attack scenario on the display device 9 (step S10, refer to FIG. 8). For example, the display control unit 8 may display each attack scenario on the display device 9 in the mode illustrated in FIGS. 5 and 6. However, the display mode of the attack scenario is not limited to the mode illustrated in FIGS. 5 and 6.

According to the present example embodiment, an attack scenario that indicates a transition from a "combination of a device, an attack state, and privileges" to another "combination of a device, an attack state, and privileges" is generated. Thus, it is possible to present such an attack scenario to the security administrator (hereinafter, referred to as "administrator"). Therefore, it is possible to present the analysis results for a system to be diagnosed so that an attack order, etc. can be easily understood.

In the above example embodiment, the case where the analysis system 1 performs a loop process starting from step S5 was explained as an example. The analysis system 1 may realize parallel processing from step S6 for each pair generated in step S4.

Next, a modification of the first example embodiment is described. In the present modification, the analysis system 1 displays the attack scenario superimposed on a network topology of devices included in the system to be diagnosed. The modification of displaying the attack scenario superimposed on the network topology of the devices included in the system to be diagnosed can also be applied to the second example embodiment and third example embodiment described below.

Figure 9:
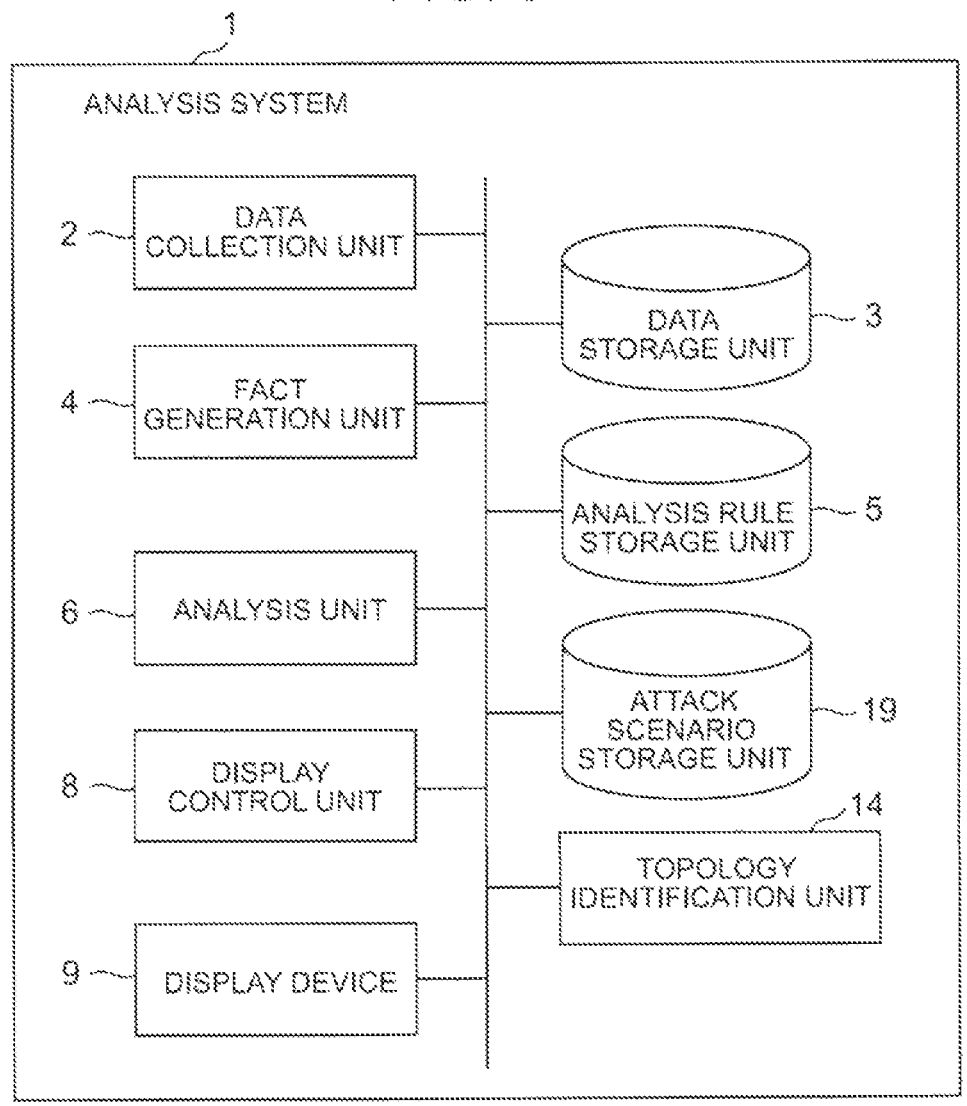
FIG. 9 It depicts a block diagram showing an example of an analysis system in a modification of the first example embodiment.

FIG. 9 is a block diagram showing an example of an analysis system in the modification of the first example embodiment. Elements similar to those shown in FIG. 2 are added to the same signs as in FIG. 2 and the description is omitted. The analysis system 1 of the present modification comprises a topology identification unit 13 in addition to each element shown in FIG. 2.

The topology identification unit 14 identifies the network topology of each device included in the system to be diagnosed. Specifically, the topology identification unit 14 may identify the network topology of each device based on a configuration of the network topology given by the administrator, or may identify the network topology of each device based on the information regarding each device stored in the data storage unit 3. Hereinafter, in the network topology, a node representing a device is referred to as a device node.

The topology identification unit 14 is realized, for example, by the CPU of the computer that operates according to the analysis program. For example, the CPU can read the analysis program from the program recording medium and operate as the topology identification unit 14 according to the program.

Figure 10:
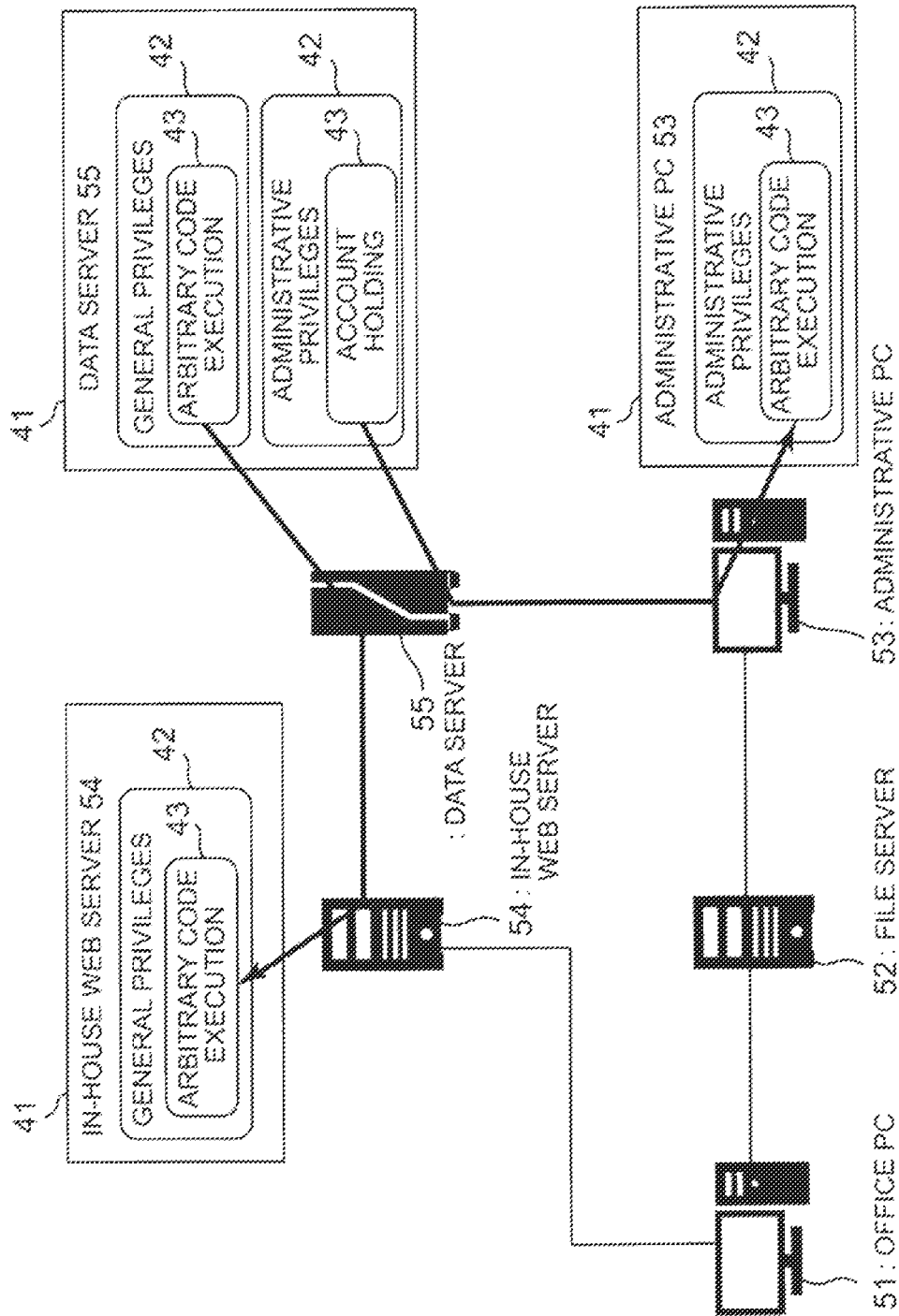
FIG. 10 It depicts a schematic diagram showing an example of the display by superimposing an attack scenario on a network topology.

The display control unit 8 displays on the display device 9 by superimposing the attack scenario on the network topology identified by the topology identification unit 14. FIG. 10 is a schematic diagram showing an example of the display by superimposing an attack scenario on a network topology. In FIG. 10, in order to simplify the drawing, the number of the second icon 42 and the third icon 43 is shown in a small number.

The display control unit 8 displays the network topology. FIG. 10 shows a case where a network topology including an office PC 51, a file server 52, an administrative PC 53, an in-house Web server 54, and a data server 55 included in the system to be diagnosed as device nodes is displayed. It is preferable that the display control unit 8 displays each device node in the network topology with an icon having a shape corresponding to the type of device represented by the device node, respectively.

In addition, the display control unit 8 displays, for example, the first icon 41 including the second icon 42 and the third icon 43 in the vicinity of the device node. The display control unit 8 then displays the edge representing the attack scenario by superimposing it on the edge connecting the device nodes in the network topology (refer to FIG. 10).

In the example shown in FIG. 10, an attack scenario indicating a transition from the combination of "the data server 55, arbitrary code execution, and general privileges" to the combination of "the in-house Web server 54, arbitrary code execution, general privileges" and an attack scenario indicating a transition from the combination of "the data server 55, account holding, and administrative privileges" to the combination of "the administrative PC 53, arbitrary code execution, and administrative privileges" are displayed. In FIG. 10, in order to simplify the drawing, the case where the above two attack scenarios are displayed is illustrated, but the displayed attack scenarios are not limited to the above two attack scenarios. When there is an edge that fits inside the first icon 41 or an edge that fits inside the second icon 42 based on the attack scenarios, the display control unit 8 may display the attack scenarios by displaying those edges as well.

According to the present modification, since not only the attack scenario but also the network topology is displayed, the administrator can more easily understand the attack order, etc.

Example Embodiment 2

Since an example of the analysis system 1 of the second example embodiment of the present invention can be represented as shown in FIG. 9, the second example embodiment will be described with reference to FIG. 9. The matters described in the first example embodiment and the modification are omitted from the description.

In the second example embodiment, the display control unit 8 receives the designation of a first device and a second device from the outside. Hereinafter, the case where the display control unit 8 receives the designation of the first device and the second device from the administrator will be described as an example.

When the first device and second device are designated by the administrator, the display control unit 8 displays the attack scenario from the first device to the second device.

In this example, the display control unit 8 displays the network topology identified by the topology identification unit 14 (refer to FIG. 9) on the display device 9, and receives the designation of the first device and the second device, for example, by a click operation on the device node by the administrator.

The operation until each attack scenario is stored in the attack scenario storage unit 19 is the same as the first example embodiment.

Figure 11:
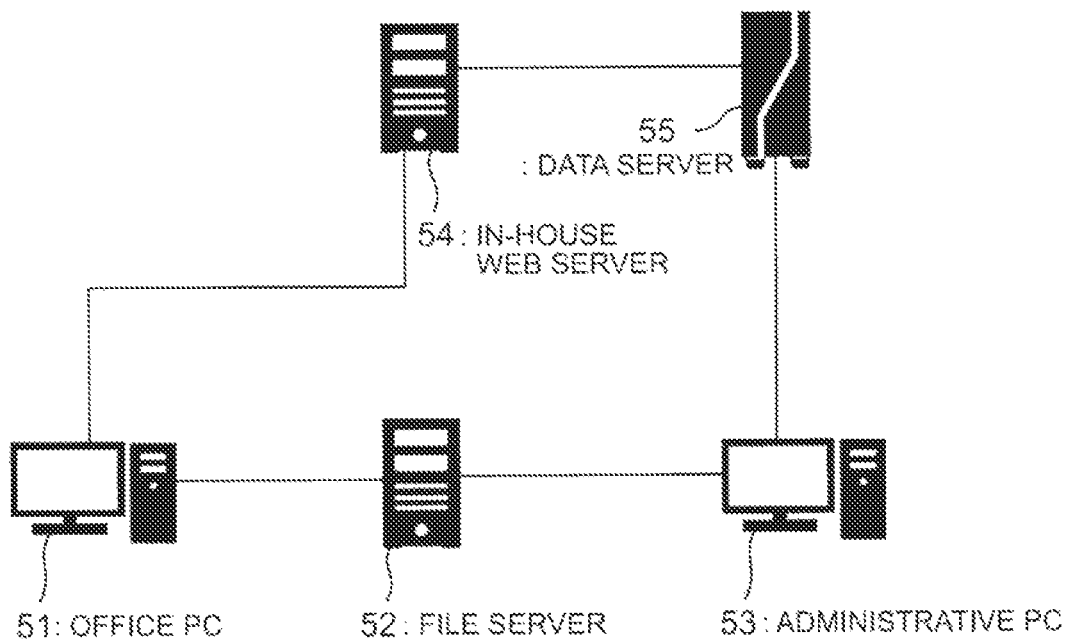
FIG. 11 It depicts a schematic diagram showing an example of the display of a network topology.
Figure 12:
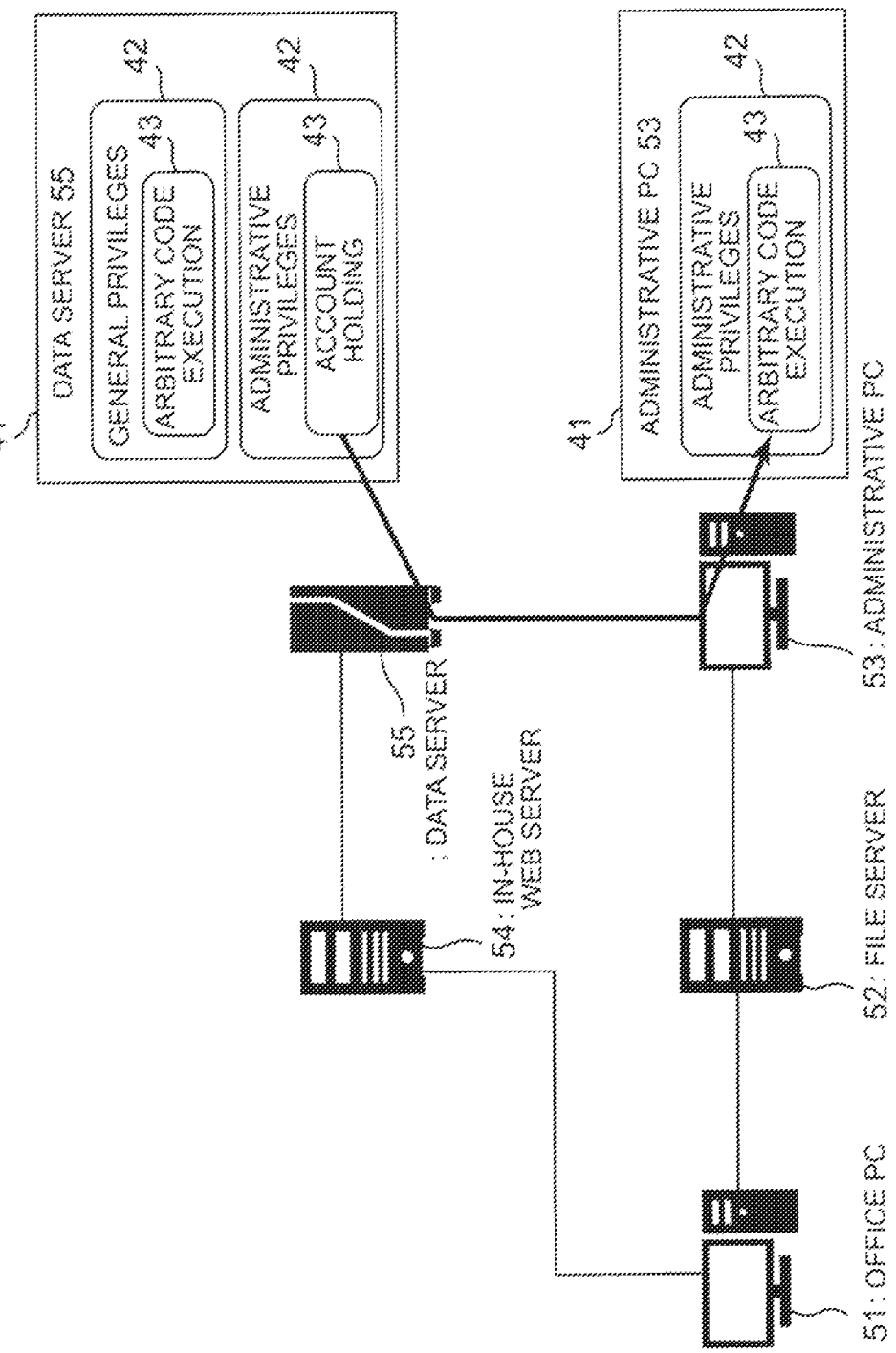
FIG. 12 It depicts a schematic diagram showing an example of the display of an attack scenario in the second example embodiment.

Before displaying the attack scenario, the display control unit 8 first displays the network topology on the display device 9. FIG. 11 is a schematic diagram showing an example of the display of the network topology. For example, in the example shown in FIG. 11, assumed that the data server 55 is designated as the first device by clicking the icon of the data server 55 by the administrator, and the administrative PC 53 is designated as the second device by clicking the icon of the administrative PC 53. In this case, the display control unit 8 displays an attack scenario from the data server 55 (the first device) to the administrative PC 53 (the second device). In this case, an example of the display of the attack scenario is shown in FIG. 12. In the example shown in FIG. 12, the case where an attack scenario indicating a transition from the combination of "the data server 55, account holding, administrator privileges" to the combination of "administrative PC 53, arbitrary code execution, administrative privileges" is displayed is illustrated. In FIG. 12, for simplicity of the drawing, the case where the above one attack scenario is displayed is illustrated, but the attack scenarios which are displayed are not limited to the above one attack scenario. When there is an edge that fits inside the first icon 41 or an edge that fits inside the second icon 42 based on the attack scenario, the display control unit 8 may the display attack scenarios by displaying those edges as well.

In the above example, the in-house Web server 54 is not designated as the second device. Therefore, as illustrated in FIG. 10, even if there is an attack scenario that indicates a transition from the combination of "the data server 55, arbitrary code execution, and general privileges" to the combination of "the in-house Web server 54, arbitrary code execution, general privileges", the display control unit 8 does not display the attack scenario.

An upper limit may be set for the number of hops of the third icon 43 or the number of hops of the device. For example, assumed that there are multiple attack scenarios from the data server 55 (the first device) to the administrative PC 53 (the second device). In this case, the display control unit 8 displays only those attack scenarios in which the number of hops of the third icon 43 (which may be the number of hops of the device) is equal to or less than the upper limit among the multiple attack scenarios.

When the first device is designated, the display control unit 8 may identify a device that is a candidate for the second device based on each attack scenario and display by emphasizing the icon of the device. For example, the icon of the device that is a candidate for the second device may be emphasized by displaying it in a predetermined color, such as red. There may be multiple devices that are candidates for the second device. When the second device is designated by the administrator from among the devices that are candidates for the second device, the display control unit 8 displays an attack scenario from the first device to the second device.

According to the present example embodiment, an attack scenario from the first device to the second device is displayed. Therefore, the administrator can narrow down the displayed attack scenario by designating the first device and second device. Therefore, the administrator can prevent the attack scenario regarding the device not being paid attention from being displayed, and can prevent the attack scenario from becoming difficult to see by displaying a large number of attack scenarios not being paid attention to.

In the above example, the case where the first device and second device are designated has been described. In the second example embodiment, one device may be designated from the outside. Hereinafter, a case where one device is designated by the administrator will be described as an example.

When one device is designated by the administrator, the display control unit 8 displays an attack scenario from the one device to another device. For example, assumed that the display control unit 8 displays the network topology illustrated in FIG. 11 and the data server 55 is designated by the administrator by clicking the icon of the data server 55. In this case, the display control unit 8 displays attack scenarios from the data server 55 to other devices (in the example shown in FIG. 10, the administrative PC 53 and the in-house Web server 54), for example, as illustrated in FIG. 10. FIG. 10 has already been described, so the explanation is omitted here.

Even in this case, the number of hops of the third icon 43 or the number of hops of the device may be set to an upper limit. For example, assumed that there are multiple attack scenarios from one designated device to other devices. In such a case, the display control unit 8 displays only the attack scenarios in which the number of hops (which may be the number of hops of the device) of the third icon 43 is equal to or less than the upper limit among the plurality of attack scenarios.

Even in this case, it is possible to prevent the attack scenario from becoming difficult to see by displaying a large number of attack scenarios that the administrator is not paying attention to.

In the above example, the case where the display control unit 8 displays the network topology and the device is designated by an operation such as clicking on the icon included in the network topology has been described. The method of designating the device is not limited to such a method. When the network topology is not used when designating the device, the topology identification unit 14 (refer to FIG. 9) may not be provided.

Example Embodiment 3

Figure 13:
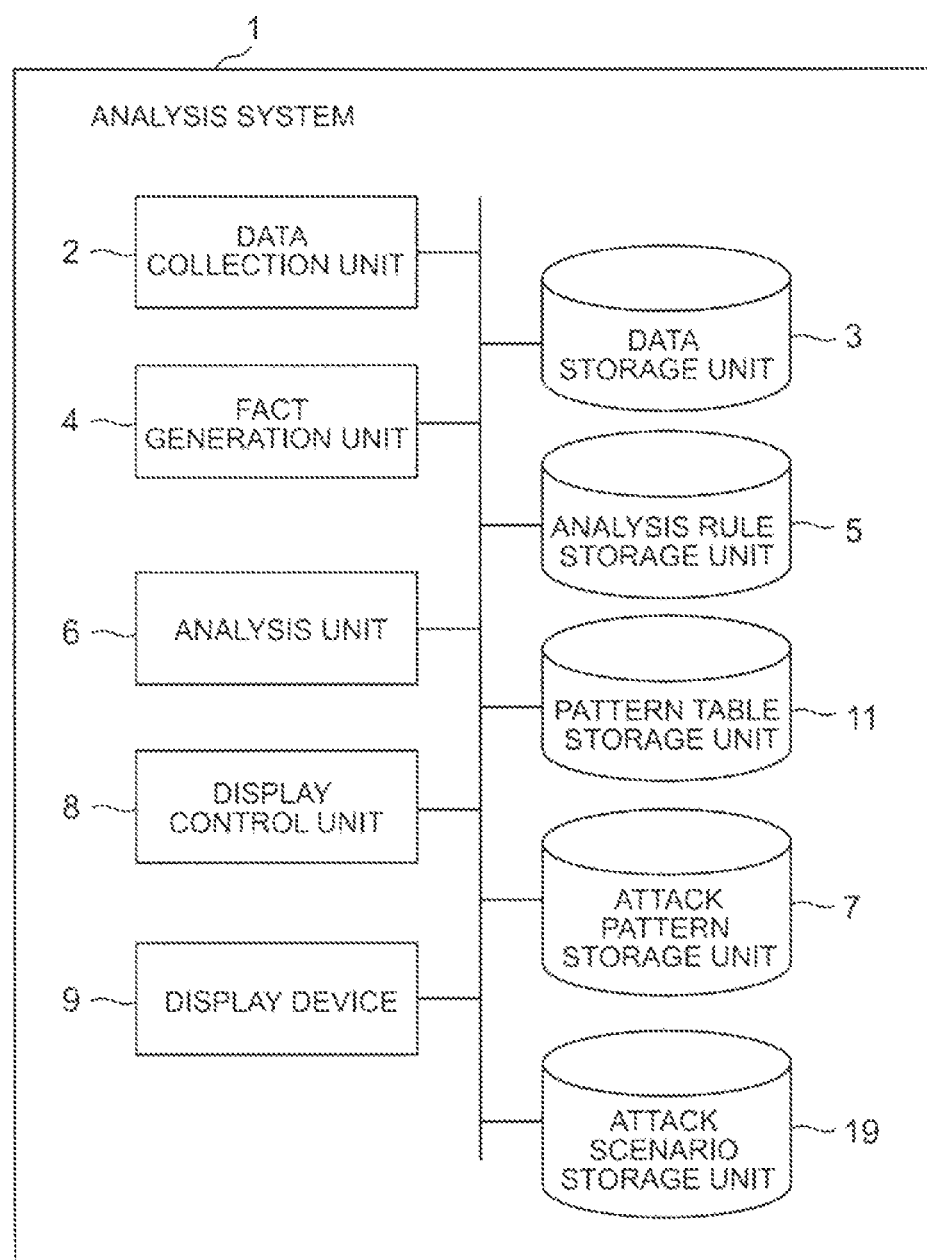
FIG. 13 It depicts a block diagram showing an example of an analysis system of the third example embodiment of the present invention.

FIG. 13 is a block diagram showing an example of the analysis system of the third example embodiment of the present invention. The matters described in the first example embodiment are omitted from the description. The analysis system 1 of the third example embodiment comprises a pattern table storage unit 11 and an attack pattern storage unit 7 in addition to each element provided by the analysis system 1 of the first example embodiment (refer to FIG. 2).

In the third example embodiment, the analysis unit 6 analyzes whether or not it is possible to derive the fact that is the end point from the fact that is the start point, for each pair of the fact that is the start point and the fact that is the end point. Then, the analysis unit 6 generates an analysis scenario for the pair for which it is determined that it is possible to derive the fact that is the end point from the fact that is the start point. This operation of the analysis unit 6 is the same as that of the analysis unit 6 in the first example embodiment. In the third example embodiment, the analysis unit 6 generates not only an analysis scenario but also an attack pattern for the pair for which it is determined that it is possible to derive the fact that is the end point from the fact that is the start point. The attack pattern is information that includes at least an attack condition, an attack result, and an attack means. The attack pattern may include other information. The details of the attack pattern are described later.

In the third example embodiment, for example, when displaying an attack scenario, the display control unit 8 displays the attack pattern associated with the attack scenario. In other words, when displaying an attack scenario, the display control unit 8 displays the attack pattern generated based on the pair (a pair of the fact that is the start point and the fact that is the end point) on which the attack scenario is based. Examples of displaying the attack scenario and the attack pattern are described later.

Next, generation of attack patterns will be described. When the analysis unit 6 determines that it is possible to derive a fact that is the end point from the fact that is the start point, the analysis unit 6 generates an attack pattern for the pair of facts. As described above, the attack pattern is information that includes at least an attack condition, an attack result, and an attack means. Here, the attack condition is a pair of the attack state and privileges at the start point, and the attack result is a pair of the attack state and privileges at the end point. The attack means is vulnerability that an attacker uses to attack, or attack method (e.g., ArpSpoofing etc.). The attack pattern may include information other than an attack condition, an attack result and an attack means.

FIG. 14 is a schematic diagram showing an example of an attack pattern. In the example shown in FIG. 14, the attack pattern includes a pattern number, an attack condition, an attack result, a pattern overview, an attack risk, user involvement, an attack means, and a segment. Relating the pattern number, the attack condition, the attack result, the pattern overview, the attack risk, and the user involvement are defined in advance in the pattern table stored by the pattern table storage unit 11. In some cases, the attack means is defined in advance for the pair of the attack condition and the attack result. The pattern table will be described later.

As mentioned above, the attack condition is a pair of an attack state and privileges at the start point, and the attack result is a pair of an attack state and privileges at the end point. The attack condition can be identified from the attack state and privileges included in the fact that is the start point. The attack result can be identified from the attack state and privileges included in the fact that is the end point.

The pattern overview is a summarized description of the attack pattern. In FIG. 14, the specific contents of the pattern overview are omitted. This is also true for FIG. 15, which shows an example of a pattern table, described below.

The attack risk is a value that indicates the degree of impact of an attack on the system to be diagnosed.

The user involvement indicates whether the attack requires an operation by the attacker himself or herself from the local environment, for example, through USB (Universal Serial Bus).

As described above, the attack means is vulnerability that an attacker uses to attack or attack method (e.g., ArpSpoofing, etc.).

There are two main types of security vulnerabilities. The first is vulnerability caused by software or device (routers, etc.) problems. Information on this vulnerability is collected and classified by various organizations, and the vulnerabilities are numbered accordingly. As an example, in the common vulnerability identifier CVE, an identifier in the form of "CVE-**-**" is assigned to each discovered vulnerability. The second is vulnerability caused by a protocol specification. Examples of the vulnerability are "FTP (File Transfer Protocol) malicious use", "Telnet malicious use" and "SMB (Server Message Block) malicious use", etc. In the example embodiment of the present invention, the vulnerabilities include the first vulnerability and the second vulnerability.

The segment is a path between a device and other devices in the system to be diagnosed, and a path between a device and itself. To each segment in the system to be diagnosed, identification information is assigned in advance. "S1" and so on, shown as a segment illustrated in FIG. 14, are the identification information of the segment.

In the attack pattern, an attack means is defined according to the analysis rule used to derive the fact that is the end point. However, the attack means may be predetermined for a pair of an attack state and an attack result.

In the attack pattern, the segment is defined according to the fact that is the start point and the fact that is the end point.

A table in which the attack means defined according to the analysis rule used to derive the fact that is the end point is set to be pending, the segment is set to be pending, and other matters being not pending that are included in the attack pattern are stored is called a pattern table. The pattern table is predetermined and stored in the pattern table storage unit 11.

FIG. 15 is a schematic diagram showing an example of a pattern table. In FIG. 15, a blank field indicates that the information is set to be pending. The "ArpSpoofing" shown in FIG. 15 is a pre-determined attack means for a pair of an attack state and an attack result.

In each record of the pattern table, at least the pattern number, the attack condition, and the attack result are defined.

When the analysis unit 6 determines that it is possible to derive the fact that is the end point from the fact that is the start point, the analysis unit 6 searches the pattern table (refer to FIG. 15) for a record corresponding to the attack state and privileges included in the fact that is the start point, the attack state and privileges included in the fact that is the end point, and the analysis rule used to derive the fact that is the end point. Then, by identifying the pending information in the found record, the attack pattern for the pair of the fact that is the start point and the fact that is the end point is generated.

In the pattern table illustrated in FIG. 15, a pair of the attack condition and the attack result of pattern number "1" and a pair of the attack condition and the attack result of pattern number "2" are common. In other words, there can be multiple records with a common set of an attack condition and an attack result. This means that there are multiple analysis rules used to derive the facts that are the end points that represent the same attack result, and the way the pending information is defined differs depending on the difference in the analysis rules. Each record in the pattern table that has a common set of an attack condition and an attack result is associated with a different analysis rule in advance. Depending on the associated analysis rule, the method of identifying the pending attack means in the record will be different.

FIG. 16 is a schematic diagram showing that facts that are the end points derived from a fact that is the start point are identical, but the processes of deriving the facts that are the end points are different, and the analysis rules used to derive the facts that are the end points are different. FIG. 16 shows an example where the end point of the combination "Host B/data tampering/administrative privileges" is derived from the start point of the combination "Host A/arbitrary code execution/general privileges". However, facts 61 and 62 are facts derived by different analysis rules. The fact 61 is a fact derived by an analysis rule labeled "dataInject01", and the fact 62 is a fact derived by an analysis rule labeled "dataInject02". Here, the analysis rule labeled "dataInject01" is associated with record "1" in the pattern table illustrated in FIG. 15. The analysis rule labeled "dataInject02" is associated with record "2" in the pattern table. Therefore, the method of deriving the attack means is different between record "1" and record "2", which share the same set of an attack condition and an attack result.

FIG. 17 shows an example of an analysis rule labeled "dataInject01". When the analysis rule illustrated in FIG. 17 is used to derive a fact that is the end point, the analysis unit 6 searches for record "1", which is associated with the analysis rule illustrated in FIG. 17, among the records including the attack condition "arbitrary code execution/ general privileges" and the attack result "data tampering/ administrative privileges". Then, the analysis unit 6 generates a new attack pattern by identifying the attack means and the segment in the record. In the case of identifying the attack means of record "1" associated with the analysis rule illustrated in FIG. 17, the analysis unit 6 may identify the vulnerability identification information assigned to the wildcard "CVEID" (refer to FIG. 17) regarding the vulnerability identification information described in the second line element of the analysis rule when deriving the fact that is the end point. As a result, the analysis unit 6 identifies "CVE-2010-000x", for example, as the attack means for record "1". In addition, the analysis unit 6 may identify identification information of the segment that indicates a route from the device included in the fact that is the start point to the device included in the fact that is the end point, as the segment of record "1".

FIG. 18 shows an example of an analysis rule labeled "dataInject02". When the analysis rule illustrated in FIG. 18 is used to derive the fact that is the end point, the analysis unit 6 searches for record "2", which is associated with the analysis rule illustrated in FIG. 18, among the records including the attack condition "arbitrary code execution/ general privileges" and the attack result "data tampering/ administrative privileges". Then, the analysis unit 6 generates a new attack pattern by identifying the attack means and the segment in the record. In the case of identifying the attack means for record "2", which is associated with the analysis rule illustrated in FIG. 18, the analysis unit 6 generates a new attack pattern by identifying the attack means and segment for that record. In the case of identifying the attack means of record "2" associated with the analysis rule illustrated in FIG. 18, the analysis unit 6 may identify information assigned to the variable "Flow" (refer to FIG. 18) in the third line element "data flow (SrcHost, DstHost, Flow)" of this analysis rule when deriving the fact that is the end point, and identify the protocol that corresponds to the information. The correspondence between the information assigned to the variable "Flow" and the protocol is known in advance when analyzing whether or not it is possible to derive the fact that is the end point from the fact that is the start point. As a result, the analysis unit 6 identifies "SMB (i.e., malicious use of SMB)", for example, as the attack means for record "2". In addition, the analysis unit 6 may identify identification information of the segment that indicates a route from the device included in the fact that is the start point to the device included in the fact that is the end point, as the segment of record "2".

In the above, examples of the operation of identifying the attack means have been shown, using the analysis rule illustrated in FIG. 17 or in FIG. 18 when deriving the fact that is the end point. However, the operation to identify the attack means is not limited to the above examples. When the analysis unit 6 identifies an attack means for a record in the pattern table that includes the attack condition and the attack result known from the fact that is the start point and the fact that is the end point, and that is associated with the analysis rule used when deriving the fact that is the end point, and that is associated with the analysis rule used for deriving the fact that is the end point, the analysis unit 6 may identify the attack means using the method defined for the analysis rule.

In some cases, such as the record "3" shown in FIG. 15, the attack means (in this case, ArpSpoofing) is defined in advance for the pair of the attack condition and the attack result. If the analysis unit 6 finds such a record, the analysis unit 6 can generate an attack pattern that includes the attack means already defined in that record.

When identifying the segment, the analysis unit 6 may identify the identification information of the segment that shows the path from the device included in the fact that is the start point to the device included in the fact that is the end point.

When the analysis unit 6 determines that it is possible to derive the fact that is the end point from the fact that is the start point, the analysis unit 6 generates an attack pattern that includes the attack state and privileges included in the fact that is the start point, the attack state and privileges included in the fact that is the end point, the decided information included in the record corresponding to the analysis rule used to derive the fact that is the end point, and the attack means and the segment identified described above.

Here, the attack condition included in the generated attack pattern corresponds to the attack state and privileges included in the fact that is the start point, and the attack result included in the attack pattern corresponds to the attack state and privileges included in the fact that is the end point.

The analysis unit 6 generates one or more pairs of a fact that is the start and a fact that is the end point. Therefore, it is possible that the same record may be retrieved from the pattern table multiple times. In such a case, the analysis unit 6 can identify the pending matter in the record each time it is retrieved, and add the newly identified matter to the attack pattern.

FIG. 14 shows an example of an attack pattern generated by the analysis unit 6 as described above.

The analysis unit 6 stores the generated attack pattern in the attack pattern storage unit 7. The attack pattern storage unit 7 is a storage device that stores the attack patterns.

The pattern table storage unit 11 and the attack pattern storage unit 7 are realized by the storage device provided by the computer.

Figure 19:
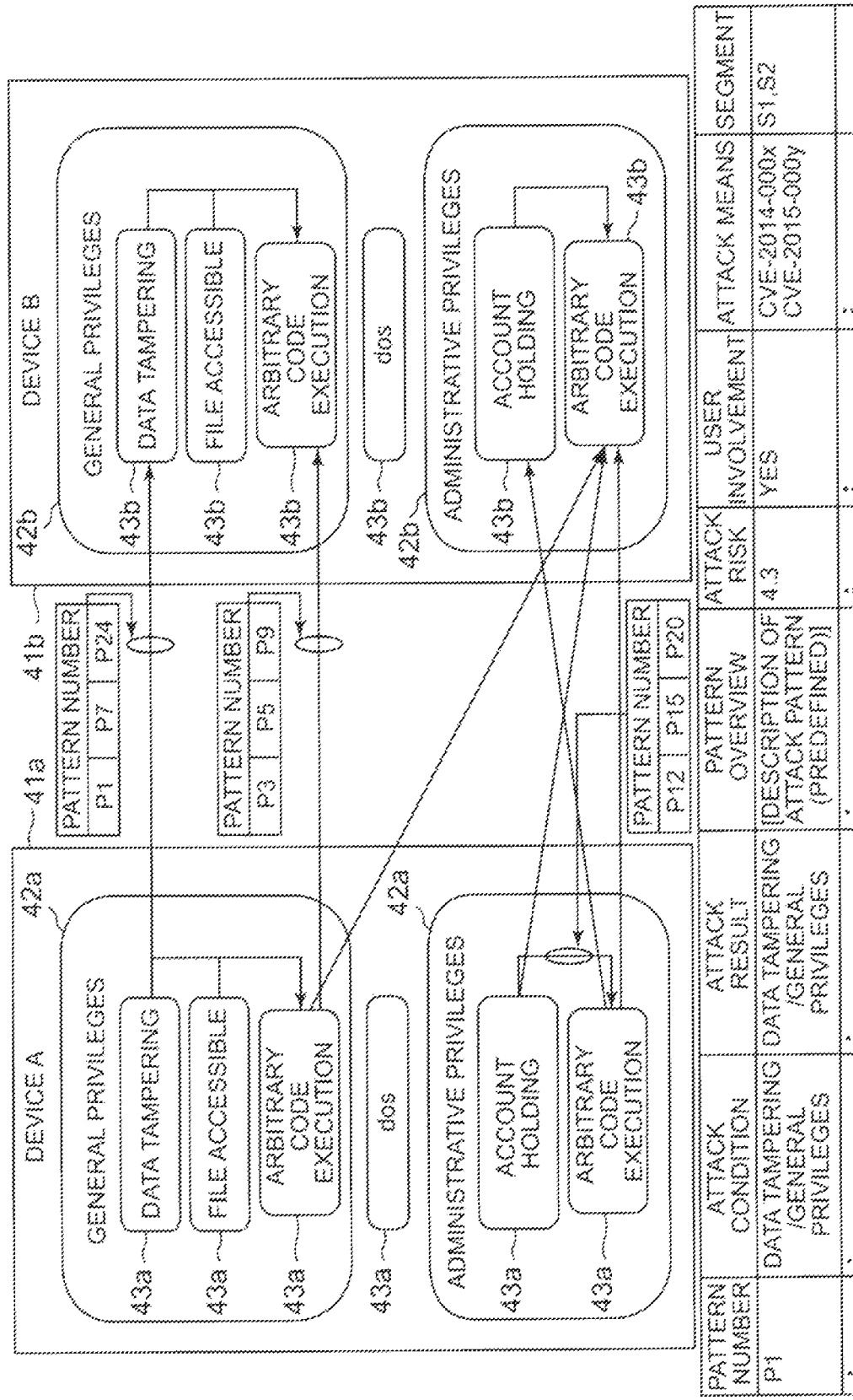
FIG. 19 It depicts a schematic diagram showing an example of the display of an attack scenario and an attack pattern.

Next, an example of the display of an attack scenario and an attack pattern will be described. As described above, when displaying an attack scenario, the display control unit 8 displays the attack pattern generated based on the pair (a pair of the fact that is the start point and the fact that is the end point) on which the attack scenario is based. FIG. 19 is a schematic diagram showing an example of the display of an attack scenario and an attack pattern.

For example, as illustrated in FIG. 19, the display control unit 8 may display a list of attack patterns, along with displaying the pattern numbers of the attack patterns generated based on the pairs on which the attack scenario is based, in association with the edges representing the attack scenario. With such a display, the administrator can grasp the attack pattern associated with the attack scenario.

The mode in which an attack pattern associated with an attack scenario is displayed is not limited to the example shown in FIG. 19. For example, the display control unit 8 displays the pattern numbers of the attack patterns generated based on the pairs on which the attack scenario is based, in association with the edge representing the attack scenario, and when a click or other operation is performed on the displayed pattern number, the attack pattern of the pattern number may be displayed.

In the present example embodiment, in step S9 (refer to FIG. 7), in addition to the operation of step 9 in the first example embodiment, the analysis unit 6 may also perform an operation of generating an attack pattern in the selected pair and storing the attack pattern in the attack pattern storage unit 7. Further, in step S10 (refer to FIG. 8), in addition to the operation of step 10 in the first example embodiment, the display control unit 8 may also perform an operation of displaying an attack pattern associated with an attack scenario.

According to the present example embodiment, since the analysis unit 6 displays not only an attack scenario but also an attack pattern, it is possible to present the analysis result regarding the attack to the administrator more specifically.

A modification of the first example embodiment or the second example embodiment may be applied to the third example embodiment.

In each of the example embodiments, it has been explained that the analysis unit 6 generates a combination of one of the devices, one of the multiple types of attack states, and one of the privileges that can correspond to the attack target as the fact that is the start point or the fact that is the end point of the attack graph. When generating the fact that is the start point and the fact that is the end point of the attack graph, the analysis unit 6 does not include the privileges in the combination, but instead generates a combination of one of the devices and one of the multiple types of attack states as the fact that is the start point or the fact that is the end point. In other words, each of the fact that is the start point and the fact that is the end point may be at least a pair of a device and an attack state. In this case, the analysis unit 6 may generate a combination of one of the devices and one of the multiple attack states as the fact that is the start point of the attack graph and a combination of one of the devices and one of the multiple attack states as the fact that is the end point of the attack graph.

The analysis unit 6 may first generate combinations that exclude privileges as the fact that is the start point and the fact that is the end point, analyze whether it is possible to derive the fact that is the end point from the fact that is the start point, and when it is determined that it is possible to derive the fact that is the end point from the fact that is the start point, the analysis unit 6 may newly generate a combination including the device, attack state, and privileges for the fact that is the start point and the fact that is the end point. Then, the analysis unit 6 may analyze whether or not it is possible to derive the fact that is the end point from the fact that is the start point again. This process can efficiently generate an attack scenario and an attack pattern while preventing redundant analysis that may occur when generating a combination that excludes privileges for the fact that is the start point or the fact that is the end point. When generating combination that exclude privileges as the fact that is the start point or the end point, it is sufficient to exclude privileges from the attack condition and the attack result in the pattern table as well.

Example Embodiment 4

In the analysis system of the fourth example embodiment of the present invention, an attack graph regarding the system to be diagnosed is input. Based on the attack graph, the analysis system of the fourth example embodiment determines pairs of combination nodes, which are nodes that indicate combinations of devices, attack states, and privileges, and generates an attack scenario for each pair of combination nodes. The attack scenario is the same as the attack scenarios in each of the aforementioned example embodiments.

Figure 20:
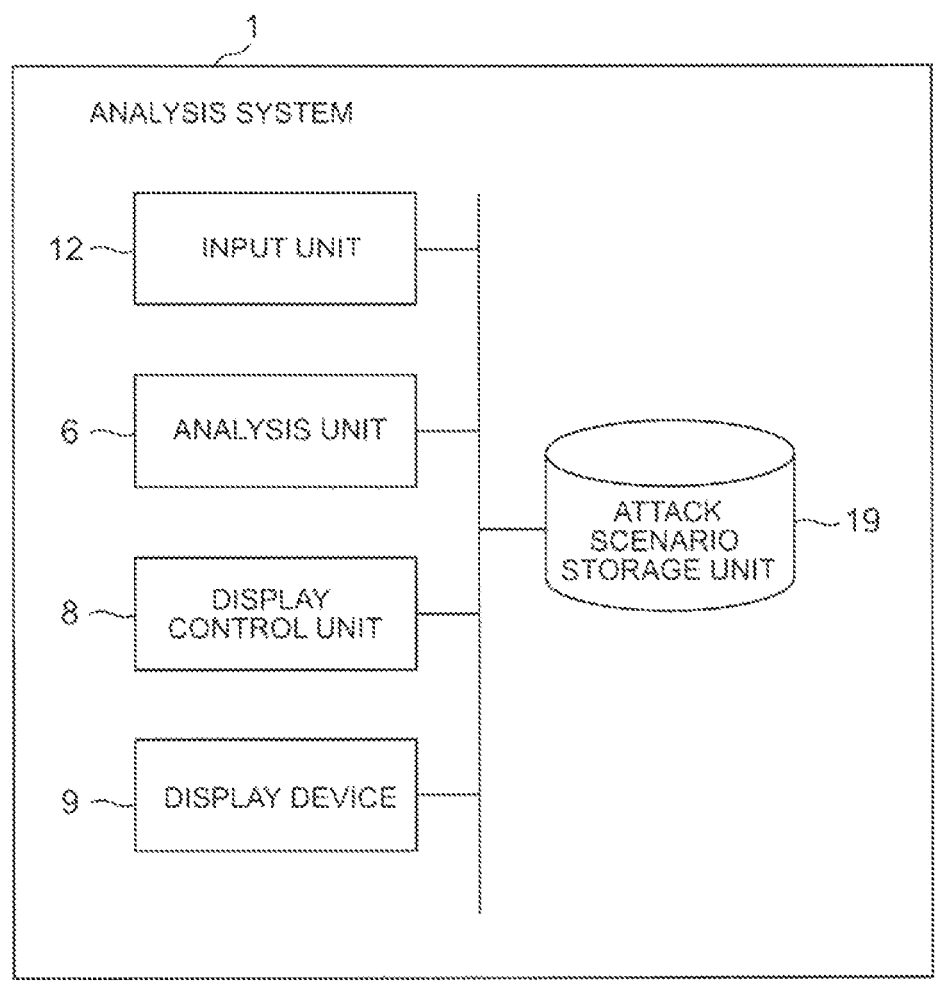
FIG. 20 It depicts a block diagram showing an example of an analysis system of the fourth example embodiment of the present invention.

FIG. 20 is a block diagram showing an example of the analysis system of the fourth example embodiment of the present invention. Elements that are the same as in the first example embodiment are marked with the same sign as in FIG. 2, and a detailed description is omitted. However, the operation of the analysis unit 6 is partially different from that of the analysis unit 6 in the first example embodiment. The operation of the analysis unit 6 in the present example embodiment will be explained as appropriate. The analysis system 1 of the fourth example embodiment comprises an input unit 12, the analysis unit 6, the attack scenario storage unit 19, the display control unit 8 and display device 9. The attack scenario storage unit 19, the display control unit 8, and the display device 9 are the same as the attack scenario storage unit 19, the display control unit 8, and the display device 9 in the first example embodiment.

An attack graph regarding the system to be diagnosed is input to the input unit 12. The input unit 12 is realized by an input device (e.g., a data reader that reads data recorded on a recording medium) that serves as an input interface for the attack graph. The analysis unit 6 receives the input of the attack graph via the input unit 12.

Figure 21:
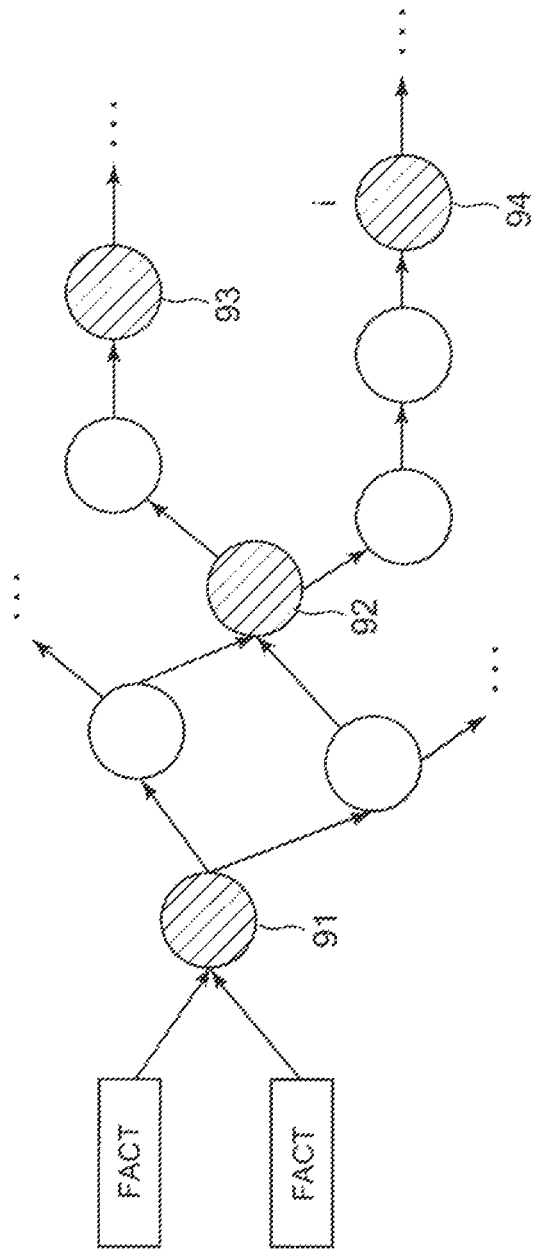
FIG. 21 It depicts a schematic diagram showing an example of an attack graph input to an input unit.

The attack graph that is input to the input unit 12 is generated in advance. FIG. 21 is a schematic diagram showing an example of an attack graph input to input unit 12. Each node included in the attack graph represents a fact. In other words, each node included in the attack graph corresponds to a fact.

The input attack graph includes nodes corresponding to facts generated based on information about each device in the system to be diagnosed, and nodes corresponding to facts generated based on already-generated nodes and analysis rules. In FIG. 21, the nodes corresponding to the facts generated based on the information about each device in the system to be diagnosed are represented by rectangles, and the nodes corresponding to the facts generated based on the already-generated nodes and analysis rules are represented by circles.

The attack graph also includes a plurality of combination nodes. A combination node is a node that represents a combination of a device, an attack state, and privileges. In other words, a combination node is a node that corresponds to a fact that corresponds to a combination of a device, an attack state, and privileges. The device indicated by a node is represented, for example, by a device ID. In addition, the attack state and the privileges are the same as the attack state and the privileges shown in the first example embodiment. In FIG. 21, combination nodes are shown in oblique lines. Also, in the example shown in FIG. 21, four combination nodes 91, 92, 93, and 94 are shown in the figure.

When the analysis unit 6 receives the input of the attack graph via input unit 12, the analysis unit 6 searches for all pairs of a combination node and the next combination node of the combination node from the attack graph. When searching for pairs of combination nodes, the analysis unit 6 searches for pairs consisting of two combination nodes so that the condition that there are no other combination nodes on the path between the two combination nodes is satisfied. For example, when the attack graph illustrated in FIG. 21 is given, the analysis unit 6 searches for a pair consisting of combination nodes 91, 92, a pair consisting of combination nodes 92, 93, and a pair consisting of combination nodes 92, 94.

Pairs that do not satisfy the above conditions include, for example, a pair of combination nodes 91, 94. There are other combination nodes 92 on the path between the combination nodes 91, 94 (refer to FIG. 21). Therefore, the analysis unit 6 does not consider the pair of combination nodes 91, 94 as a target of the search.

Of the two paired combination nodes, the upstream combination node in the attack graph is denoted as a start point combination node. Of the two paired combination nodes, the downstream combination node in the attack graph is denoted as an end point combination node. For example, in a pair consisting of combination nodes 91, 92, the combination node 91 is the start point combination node, and the combination node 92 is the end point combination node.

For each obtained pair, the analysis unit 6 generates an attack scenario (information that represents a transition relationship of a combination of a device, an attack state, and privileges that can correspond to the attack state). For each pair, the analysis unit 6 may generate information that indicates a transition from the "combination of a device, an attack state, and privileges" corresponding to the start point combination node to the "combination of a device, an attack state, and privileges" corresponding to the end point combination node as an attack scenario.

The analysis unit 6 then stores the attack scenario generated for each pair of combination nodes in the attack scenario storage unit 19.

The display control unit 8 displays each attack scenario generated by the analysis unit 6 on the display device 9. The display mode of the attack scenarios may, for example, be the same as the display mode in the first example embodiment. That is, the display control unit 8 displays a second icon representing privileges in a first icon representing a device and displays a third icon representing the attack state in the second icon for the start point combination node in the pair of combination nodes, and displays a second icon representing privileges in a first icon representing a device and displays a third icon representing the attack state in the second icon also for the end point combination node in the pair of combination nodes. The display control unit 8 may then display an edge extending from the third icon corresponding to the start point combination node to the third icon corresponding to the end point combination node.

Further, the display control unit 8 may omit displaying the second icon and display the third icon in the first icon in a predetermined case. The above predetermined case is the case where the privilege is "no relevant privileges". This point is the same as in the first example embodiment.

In the fourth example embodiment, the analysis unit 6 and the display control unit 8 are realized by a CPU of a computer that operates according to an analysis program, for example. For example, the CPU can read the analysis program from a program storage medium such as a program storage device, etc. of the computer, and operate as the analysis unit 6 and the display control unit 8 according to the analysis program. For example, the attack scenario storage unit 19 is realized by the storage device provided by the computer.

Figure 22:
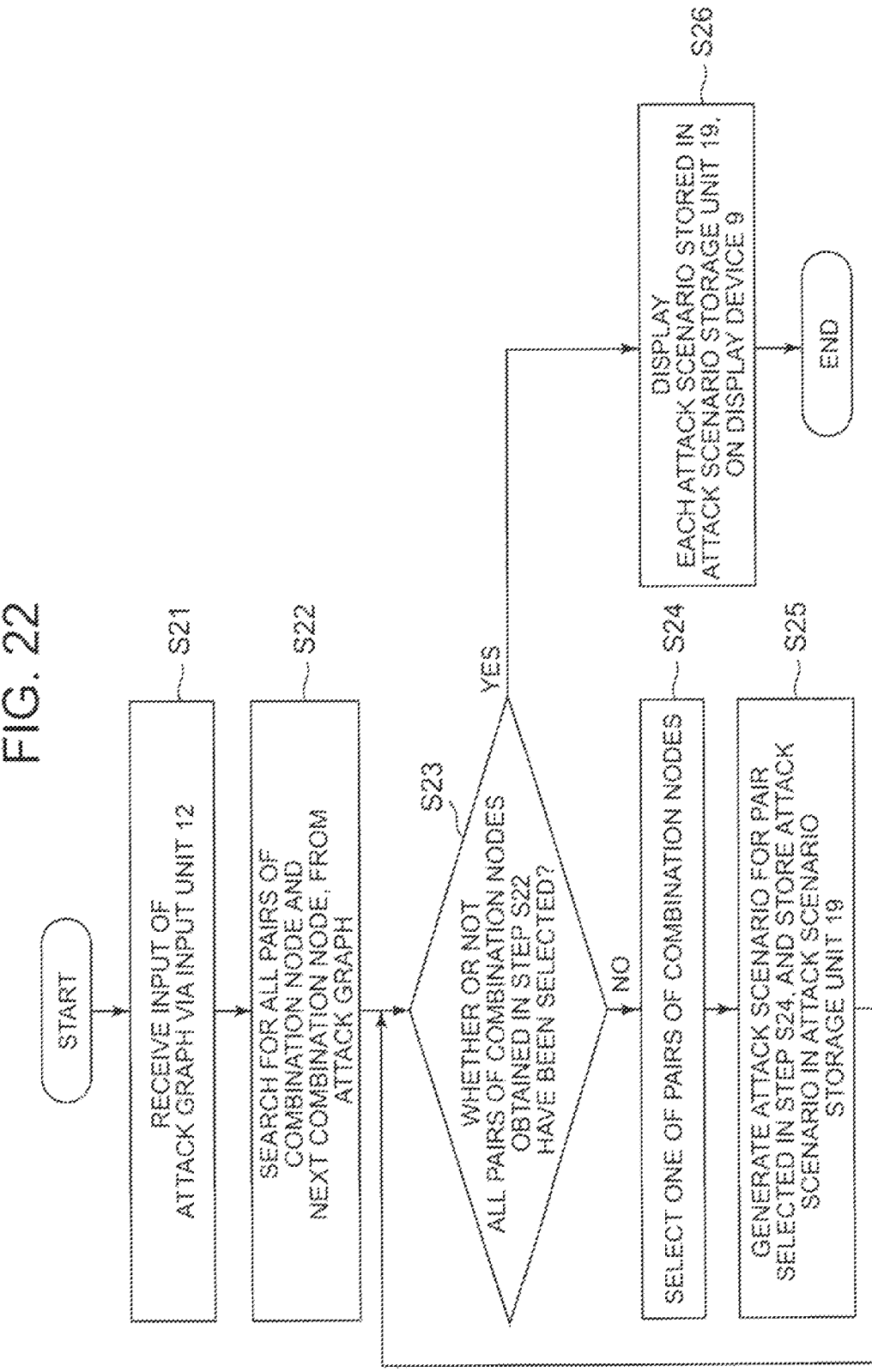
FIG. 22 It depicts a flowchart showing an example of the processing process of an analysis system of the fourth example embodiment of the present invention.

Next, the processing process will be described. FIG. 22 is a flowchart showing an example of the processing process of the analysis system of the fourth example embodiment of the present invention. The matters already explained are omitted.

First, the analysis unit 6 receives the input of the attack graph via the input unit 12 (step S21).

The analysis unit 6 searches for all pairs of a combination node and the next combination node, from the attack graph (step S22).

Next, the analysis unit 6 determines whether or not all the pairs of combination nodes obtained in step S22 have been selected in step S24 (step S23). If there are unselected pairs (No in Step S23), the process moves to step S24.

In step S24, the analysis unit 6 selects one of the pairs of combination nodes obtained in step S22 that has not yet been selected.

Next, the analysis unit 6 generates an attack scenario for the pair selected in step S24, and stores the attack scenario in the attack scenario storage unit 19 (step S25). After step S25, the analysis unit 6 repeats the process from step S23.

When the analysis unit 6 determines that all the pairs of combination nodes obtained in step S22 have already been selected in step S24 (Yes in step S23), the display control unit 8 reads each attack scenario stored in the attack scenario storage unit 19 and displays each attack scenario on the display device 9 (step S26).

In the fourth example embodiment, it is also possible to present the analysis results for a system to be diagnosed so that an attack order, etc. can be easily understood.

A modification of the first example embodiment may be applied to the fourth example embodiment. That is, the analysis system 1 of the fourth example embodiment (refer to FIG. 20) may comprise a topology identification unit that identifies the network topology of the devices included in the system to be diagnosed. For example, the topology identification unit may identify the network topology of each device based on a configuration of the network topology given by the administrator. The topology identification unit is realized, for example, by the CPU of the computer that operates according to an analysis program. This point is the same as a modification of the first example embodiment. The display control unit 8 may then display the attack scenario superimposed on the network topology. The example of displaying the attack scenario superimposed on the network topology has been described in the modification of the first example embodiment, and the explanation is omitted here.

The second example embodiment may be applied to the fourth example embodiment. That is, when the first device and second device are designated from the outside (e.g., an administrator), the display control unit 8 may display an attack scenario from the first device to the second device. Alternatively, when one device is designated from the outside (e.g., an administrator), the display control unit 8 may display attack scenarios from the one device to other devices. Examples of these displays are described in the second example embodiment, and the explanation is omitted here.

The third example embodiment may also be applied to the fourth example embodiment. That is, the analysis unit 6 may generate not only an attack scenario but also an attack pattern for each pair of combination nodes, and the display control unit 8 may display the attack patterns associated with the attack scenarios along with the attack scenarios. In this case, the analysis system 1 of the fourth example embodiment also comprises, in addition to each of the elements shown in FIG. 20, the pattern table storage unit 11 and the attack pattern storage unit 7 in the third example embodiment. The pattern table stored by the pattern table storage unit 11 has already been described in the third example embodiment, and the explanation is omitted here.

Figure 23:
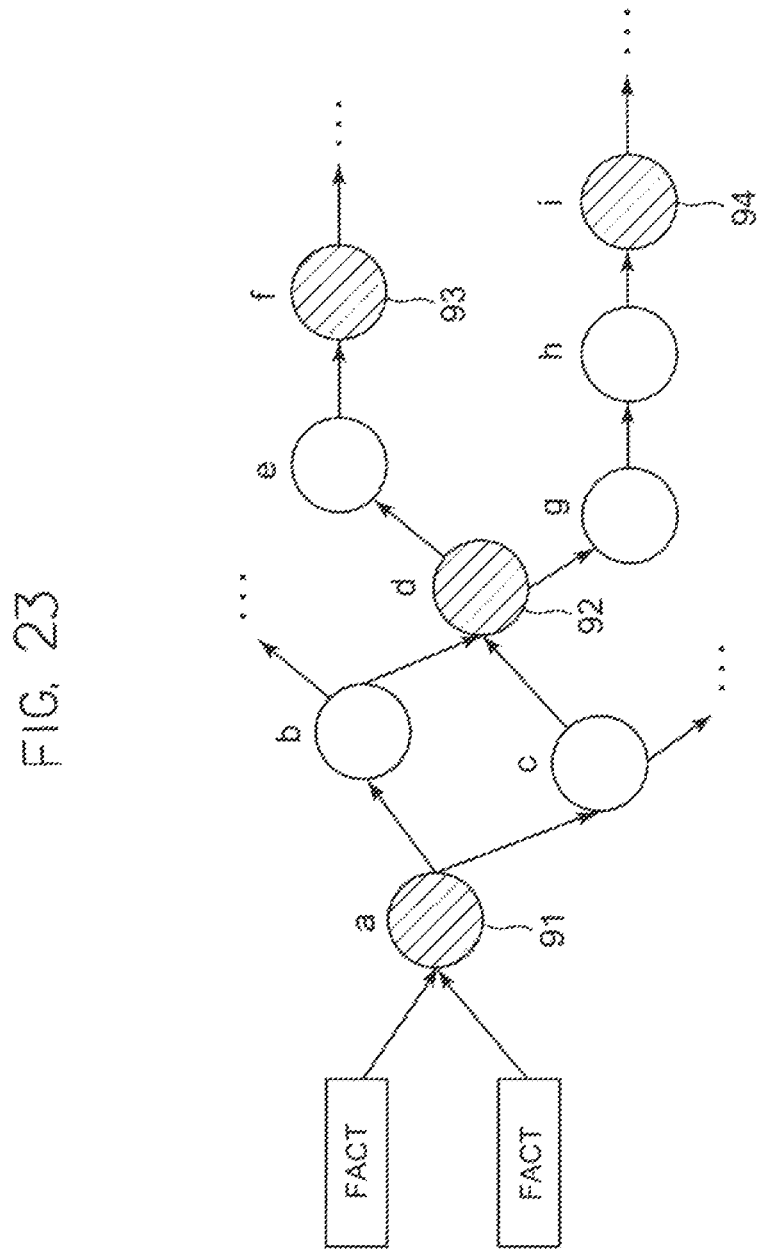
FIG. 23 It depicts a schematic diagram showing an example of an attack graph and each analysis rule that is input to input unit.

When the third example embodiment is applied to the fourth example embodiment, an attack graph regarding the system to be diagnosed and the analysis rules used to derive the facts corresponding to the nodes included in the attack graph are input to the input unit 12. The analysis unit 6 receives the input of the attack graph and each analysis rule via the input unit 12. FIG. 23 is a schematic diagram showing examples of the attack graph and each analysis rule that is input to the input unit 12. The matters already explained with reference to FIG. 21 are omitted.

In FIG. 23, the "a", "b", "c", . . . , etc., signs shown near the nodes corresponding to the facts generated based on the already-generated nodes and analysis rules represent the analysis rules used to derive the facts. The analysis rule used to derive the fact is associated with the node corresponding to the fact. Each analysis rule associated with each node is then input to the input unit 12 along with the attack graph.

When the third example embodiment is applied to the fourth example embodiment, the analysis unit 6 generates not only an attack scenario but also an attack pattern (information that includes at least an attack condition, an attack result, and an attack means) for each pair of combination nodes. Hereinafter, generation of attack patterns will be described.

When focusing on one pair of combination nodes, the analysis unit 6 generates an attack pattern based on the attack state and the privileges indicated by the start point combination node in the pair, the attack state and the privileges indicated by the end point combination node in the pair, and the analysis rule used to derive the fact corresponding to the end point combination node. The analysis rule used to derive the fact corresponding to the end point combination node is associated with that end point combination node. Therefore, the analysis unit 6 is able to identify the analysis rule used to derive the fact corresponding to the end point combination node.

The operation of generating the attack pattern based on the attack state and the privileges indicated by the start point combination node in the pair, the attack state and the privileges indicated by the end point combination node in the pair, and the analysis rule used to derive the fact corresponding to the end point combination node is the same as the operation of generating the attack pattern based on the attack state and privileges included in the fact that is the start point, the attack state and privileges included in the fact that is the end point, and the analysis rule used to derive the fact that is the end point in the third example embodiment. In other words, the analysis unit 6 searches a record, from the pattern table (refer to FIG. 15), according to the attack state and the privileges indicated by the start point combination node in the pair, the attack state and the privileges indicated by the end point combination node in the pair, and the analysis rule used to derive the fact corresponding to the combination node at the ending point. Then, by identifying the undetermined information in the searched record, the attack pattern for the pair in focus is generated.

The analysis unit 6 determines the attack means included in the attack pattern based on the analysis rule used to derive the fact corresponding to the end point combination node in the pair. This operation is similar to the operation of determining the attack means based on the analysis rule in the third example embodiment. In the third example embodiment, the operation of determining the attack means based on the analysis rules is described, for example, with reference to FIGS. 17 and 18. However, as described in the third example embodiment, the operation of identifying the attack means is not limited to the example in the case of using the analysis rules illustrated in FIG. 17 or in the case of using the analysis rules illustrated in FIG. 18. The analysis unit 6 may identify the attack means in a manner defined according to the analysis rule.

In some cases, such as the record "3" shown in FIG. 15, the attack means (in this case, ArpSpoofing) has been defined in advance for the pair of attack condition and attack result. When the analysis unit 6 searches for such a record, the analysis unit 6 can generate an attack pattern that includes the attack means that has already been defined in the record.

When identifying a segment, the analysis unit 6 may identify the identification information of the segment that indicates the route from the device indicated by the start point combination node in the pair to the device indicated by the end point combination node in the pair.

The analysis unit 6 then generates an attack pattern that includes the determined information included in the searched record and the identified attack means and the segment.

Here, the attack condition included in the generated attack pattern is the attack state and privileges indicated by the start point combination node in the pair, and the attack result included in the attack pattern is the attack state and privileges indicated by the end point combination node in the pair.

The analysis unit 6 stores the attack pattern generated for each pair of combination nodes in the attack pattern storage unit 7.

The display control unit 8 displays the attack patterns associated with the attack scenario along with the attack scenarios. This display mode has already been described with reference to FIG. 19, and the explanation is omitted here.

Figure 24:
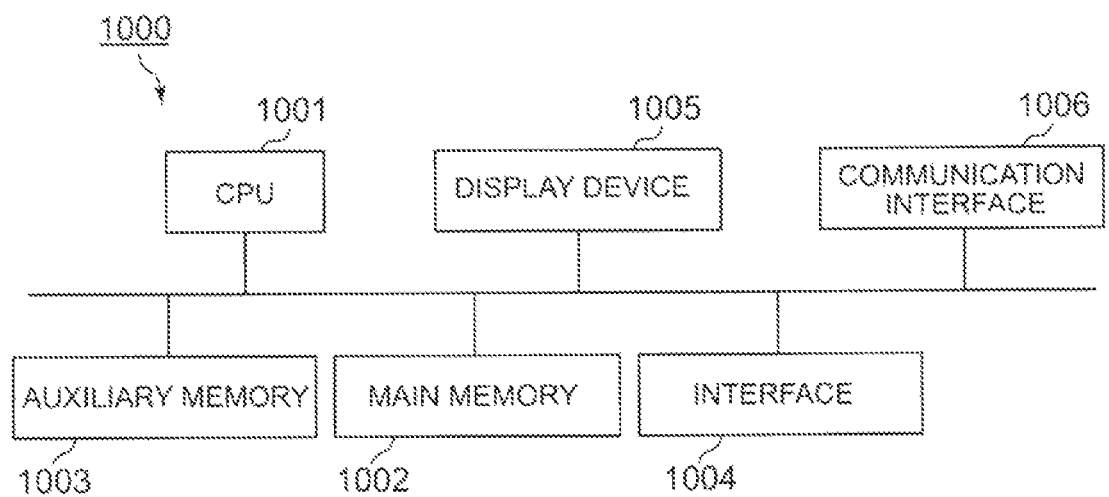
FIG. 24 It depicts a schematic block diagram showing a configuration example of a computer for an analysis system of each example embodiment of the present invention.

FIG. 24 is a schematic block diagram of a configuration example of a computer for an analysis system of each example embodiment of the present invention. The computer comprises a CPU 1001, a main memory 1002, an auxiliary memory 1003, an interface 1004, a display device 1005 and a communication interface 1006. The computer 1000 that realizes the analysis system 1 of the fourth example embodiment comprises an input device (not shown in FIG. 24) that corresponds to the input unit 12.

The analysis system 1 of each example embodiment of the present invention is realized by a computer 1000. The operation of the analysis system 1 is stored in the auxiliary memory 1003 in the form of an analysis program. The CPU 1001 reads the analysis program from the auxiliary memory 1003, deploys the program to the main memory 1002, and executes the processes described in above each example embodiment according to the analysis program.

The auxiliary memory 1003 is an example of a non-transitory tangible medium. Other examples of non-transitory tangible media are a magnetic disk, an optical magnetic disk, a CD-ROM (Compact Disk Read Only Memory), a DVD-ROM (Digital Versatile Disk Read Only Memory), a semiconductor memory, and the like, which are connected through the interface 1004. When the program is delivered to the computer 1000 through a communication line, the computer 1000 that receives the delivery may develop the program into the main memory 1002 and executes the process of each example embodiment according to the program.

Some or all of the components may be realized by general-purpose or dedicated circuitry, processors, or a combination of these. They may be configured by a single chip or by multiple chips connected through a bus. Some or all of the components may be realized by a combination of the above-mentioned circuitry, etc. and a program.

When some or all of each component is realized by multiple information processing devices, circuits, etc., the multiple information processing devices, circuits, etc. may be centrally located or distributed. For example, the information processing devices, circuits, etc. may be implemented as a client-and-server system, cloud computing system, etc., each of which is connected through a communication network.

Figure 25:
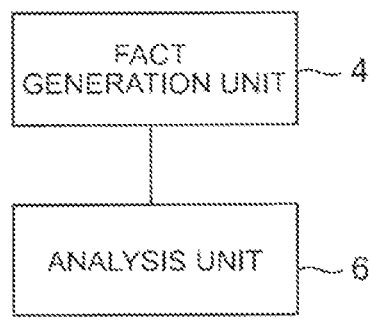
FIG. 25 It depicts a block diagram showing a summarized analysis system of the present invention.

Next, a summary of the present invention will be described. FIG. 25 is a block diagram showing a summarized analysis system of the present invention. The analysis system of the present invention comprises a fact generation unit 4 and an analysis unit 6.

The fact generation unit 4 generates a fact which is data representing a security situation of a system to be diagnosed, based on information regarding each device included in the system to be diagnosed.

The analysis unit 6 generates one or more pairs of a start point fact which is a fact representing possibility of an attack in the device that is a start point and an end point fact which is a fact representing possibility of an attack in the device that is an end point, analyzes, for each pair, whether or not it is possible to derive the end point fact from the start point fact, based on facts representing states of the devices generated based on information regarding the device that is the start point and information regarding the device that is the end point, the start point fact, and one or more analysis rules for analyzing the attack, and generates an attack scenario which is information that represents a transition relationship of a combination of the device, an attack state, and privileges that can correspond to the attack state according to the start point fact and the end point fact, in a case where it is possible to derive the end point fact from the start point fact.

With such a configuration, it is possible to present the analysis results for a system to be diagnosed so that an attack order, etc. can be easily understood.

Figure 26:
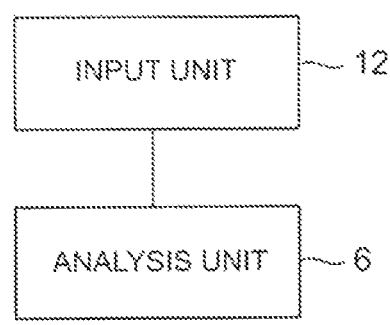
FIG. 26 It depicts a block diagram showing another example of a summarized analysis system of the present invention.

FIG. 26 is a block diagram showing another example of a summarized analysis system of the present invention. The analysis system illustrated in FIG. 26 comprises an input unit 12 and an analysis unit 6.

An attack graph regarding a system to be diagnosed is input to the input unit 12.

The analysis unit 6 searches for a pair of a combination node indicating a combination of a device, an attack state, and privileges, and a combination node next to the combination node, and generates an attack scenario which is information that represents a transition relationship of a combination of the device, the attack state, and the privileges that can correspond to the attack state, for each pair of the combination nodes.

Even with such a configuration, it is possible to present the analysis results for a system to be diagnosed so that an attack order, etc. can be easily understood.

Each example embodiment of the present invention described above may also be described as supplementary notes below, but is not limited to the following.

(Supplementary Note 1)

An analysis system comprising:
  a fact generation unit which generates a fact which is data representing a security situation of a system to be diagnosed, based on information regarding each device included in the system to be diagnosed; and
  an analysis unit which generates one or more pairs of a start point fact which is a fact representing possibility of an attack in the device that is a start point and an end point fact which is a fact representing possibility of an attack in the device that is an end point, analyzes, for each pair, whether or not it is possible to derive the end point fact from the start point fact, based on facts representing states of the devices generated based on information regarding the device that is the start point and information regarding the device that is the end point, the start point fact, and one or more analysis rules for analyzing the attack, and generates an attack scenario which is information that represents a transition relationship of a combination of the device, an attack state, and privileges that can correspond to the attack state according to the start point fact and the end point fact, in a case where it is possible to derive the end point fact from the start point fact.

(Supplementary Note 2)

The analysis system according to Supplementary note 1, wherein
  the analysis unit
  generates a combination of one of the devices, one of multiple types of attack states defined in advance, and one of privileges that can correspond to the attack state, as the start point fact, and
  generates a combination of one of the devices, one of the multiple types of the attack states, and one of privileges that can correspond to the attack state, as the end point fact.

(Supplementary Note 3)

The analysis system according to Supplementary note 1 or 2, further comprising:
  a display control unit which displays the attack scenario generated by the analysis unit on a display device.

(Supplementary Note 4)

The analysis system according to Supplementary note 3, wherein
  the display control unit displays the attack scenario by displaying a second icon representing the privileges in a first icon representing the device, displaying a third icon representing the attack state in the second icon, for each of the start point fact and the end point fact, and displaying an edge extending from the third icon corresponding to the start point fact to the third icon corresponding to the end point fact, and
  omits displaying the second icon in a predetermined case.

(Supplementary Note 5)

The analysis system according to Supplementary note 3 or 4, wherein
  when a first device and a second device are designated from outside, the display control unit displays the attack scenario from the first device to the second device.

(Supplementary Note 6)

The analysis system according to Supplementary note 3 or 4, wherein
  when one device is designated from outside, the display control unit displays the attack scenario from the one device to another device.

(Supplementary Note 7)

The analysis system according to any one of Supplementary notes 3 to 6, further comprising
  a topology identification unit which identifies a network topology of devices included in the system to be diagnosed,
  wherein the display control unit displays the attack scenario superimposed on the network topology.

(Supplementary Note 8)

The analysis system according to any one of Supplementary notes 3 to 7, wherein
  in the case where it is possible to derive the end point fact from the start point fact, the analysis unit generates an attack pattern that includes at least an attack condition, an attack result, and an attack means, and wherein the display control unit displays the attack pattern associated with the attack scenario along with the attack scenario.

(Supplementary Note 9)

An analysis system comprising:

an input unit to which an attack graph regarding a system to be diagnosed is input, and an analysis unit which searches for a pair of a combination node indicating a combination of a device, an attack state, and privileges, and a combination node next to the combination node, and generates an attack scenario which is information that represents a transition relationship of a combination of the device, the attack state, and the privileges that can correspond to the attack state, for each pair of the combination nodes.

(Supplementary Note 10)

The analysis system according to Supplementary note 9, further comprising a display control unit which displays the attack scenario generated by the analysis unit on a display device.

(Supplementary Note 11)

The analysis system according to Supplementary note 10, wherein the display control unit displays the attack scenario by displaying a second icon representing the privileges in a first icon representing the device, displaying a third icon representing the attack state in the second icon, for each of a start point combination node and an end point combination node in a pair of the combination nodes, and displaying an edge extending from the third icon corresponding to the start point combination node to the third icon corresponding to the end point combination node, and omits displaying the second icon in a predetermined case.

(Supplementary Note 12)

The analysis system according to Supplementary note 10 or 11, wherein when a first device and a second device are designated from outside, the display control unit displays the attack scenario from the first device to the second device.

(Supplementary Note 13)

The analysis system according to Supplementary note 10 or 11, wherein when one device is designated from outside, the display control unit displays the attack scenario from the one device to another device.

(Supplementary Note 14)

The analysis system according to any one of Supplementary notes 10 to 13, further comprising:

a topology identification unit which identifies a network topology of the devices included in the system to be diagnosed, wherein the display control unit displays the attack scenario superimposed on the network topology.

(Supplementary Note 15)

The analysis system according to any one of Supplementary notes 10 to 14, wherein the analysis unit generates an attack pattern that includes at least an attack condition, an attack result, and an attack means, for each pair of the combination nodes, and wherein the display control unit displays the attack pattern associated with the attack scenario along with the attack scenario.

(Supplementary Note 16)

An analysis method, wherein one or more computers generate a fact which is data representing a security situation of a system to be diagnosed, based on information regarding each device included in the system to be diagnosed; and generate one or more pairs of a start point fact which is a fact representing possibility of an attack in the device that is a start point and an end point fact which is a fact representing possibility of an attack in the device that is an end point, analyze, for each pair, whether or not it is possible to derive the end point fact from the start point fact, based on facts representing states of the devices generated based on information regarding the device that is the start point and information regarding the device that is the end point, the start point fact, and one or more analysis rules for analyzing the attack, and generate an attack scenario which is information that represents a transition relationship of a combination of the device, an attack state, and privileges that can correspond to the attack state according to the start point fact and the end point fact, in a case where it is possible to derive the end point fact from the start point fact.

(Supplementary Note 17)

An analysis method, wherein one or more computers receive an input of an attack graph regarding a system to be diagnosed, and search for a pair of a combination node indicating a combination of a device, an attack state, and privileges, and a combination node next to the combination node, and generate an attack scenario which is information that represents a transition relationship of a combination of the device, the attack state, and the privileges that can correspond to the attack state, for each pair of the combination nodes.

(Supplementary Note 18)

An analysis program causing a computer to execute:

a fact generation process of generating a fact which is data representing a security situation of a system to be diagnosed, based on information regarding each device included in the system to be diagnosed; and an analysis process of generating one or more pairs of a start point fact which is a fact representing possibility of an attack in the device that is a start point and an end point fact which is a fact representing possibility of an attack in the device that is an end point, analyzing, for each pair, whether or not it is possible to derive the end point fact from the start point fact, based on facts representing states of the devices generated based on information regarding the device that is the start point and information regarding the device that is the end point, the start point fact, and one or more analysis rules for analyzing the attack, and generating an attack scenario which is information that represents a transition relationship of a combination of the device, an attack state, and privileges that can correspond to the attack state according to the start point fact and the end point fact, in a case where it is possible to derive the end point fact from the start point fact.

(Supplementary Note 19)

An analysis program causing a computer to execute:

a receiving input process of receiving an input of an attack graph regarding a system to be diagnosed, and an analysis process of searching for a pair of a combination node indicating a combination of a device, an attack state, and privileges, and a combination node next to the combination node, and generating an attack scenario which is information that represents a transition relationship of a combination of the device, the attack state, and the privileges that can correspond to the attack state, for each pair of the combination nodes.

Although the invention of the present application has been described above with reference to the example embodiments, the present invention is not limited to the above example embodiments. Various changes can be made to the configuration and details of the present invention that can be understood by those skilled in the art within the scope of the present invention.

INDUSTRIAL APPLICABILITY

The present invention is suitably applied to an analysis system that analyzes attacks on systems to be diagnosed.

REFERENCE SIGNS LIST

1 Analysis system
2 Data collection unit
3 Data storage unit
4 Fact generation unit
5 Analysis rule storage unit
6 Analysis unit
7 Attack pattern storage unit
8 Display control unit
9 Display device
11 Pattern table storage unit
14 Topology identification unit
19 Attack scenario storage unit

What is claimed is:

1. An analysis method performed by one or more computers and comprising:
  generating a fact which is data representing a security situation of a system to be diagnosed, based on information regarding each device included in the system to be diagnosed;
  generating one or more pairs of a start point fact which is a fact representing an attack in the device that is a start point and an end point fact which is a fact representing an attack in the device that is an end point;
  analyzing, for each pair, whether or not it is possible to trace from the start point fact to the end point fact, based on facts representing states of the devices generated based on information regarding the device that is the start point and information regarding the device that is the end point, the start point fact, and one or more analysis rules for analyzing the attack; and
  generating an attack scenario which is information that represents a transition relationship of a combination of the device, an attack state, and privileges that correspond to the attack state according to the start point fact and the end point fact, in a case where it is possible to trace from the start point fact to the end point fact.

2. An analysis method performed by one or more computers and comprising:
  receiving an input of an attack graph regarding a system to be diagnosed;
  searching for, in the attack graph, a pair of a combination node indicating a combination of a device, an attack state, and privileges, and a combination node next to the combination node; and
  generating an attack scenario which is information that represents a transition relationship of a combination of the device, the attack state, and the privileges that correspond to the attack state, for each pair of the combination nodes;
  displaying the generated attack scenario on a display device by
    displaying a second icon representing the privileges in a first icon representing the device;
    displaying a third icon representing the attack state in the second icon, for each of a start point combination node and an end point combination node in a pair of the combination nodes; and
    displaying an edge extending from the third icon corresponding to the start point combination node to the third icon corresponding to the end point combination node; and
  omitting displaying the second icon in a predetermined case.

3. An analysis system comprising:
a memory storing instructions; and
a processor configured to execute the instructions to:
  generate a fact which is data representing a security situation of a system to be diagnosed, based on information regarding each device included in the system to be diagnosed; and
  generate one or more pairs of a start point fact which is a fact representing an attack in the device that is a start point and an end point fact which is a fact representing an attack in the device that is an end point;
  analyze, for each pair, whether or not it is possible to trace from the start point fact to the end point fact, based on facts representing states of the devices generated based on information regarding the device that is the start point and information regarding the device that is the end point, the start point fact, and one or more analysis rules for analyzing the attack; and
  generate an attack scenario which is information that represents a transition relationship of a combination of the device, an attack state, and privileges that correspond to the attack state according to the start point fact and the end point fact, in a case where it is possible to trace from the start point fact to the end point fact.

4. The analysis system according to claim 3, wherein the processor
generates a combination of one of the devices, one of multiple types of attack states defined in advance, and one of privileges that correspond to the attack state, as the start point fact, and
generates a combination of one of the devices, one of the multiple types of the attack states, and one of privileges that correspond to the attack state, as the end point fact.

5. The analysis system according to claim 3, wherein the processor displays the generated attack scenario on a display device.

6. The analysis system according to claim 5, wherein the processor displays the attack scenario by displaying a second icon representing the privileges in a first icon representing the device, displaying a third icon representing the attack state in the second icon, for each of the start point fact and the end point fact, and displaying an edge extending from the third icon corresponding to the start point fact to the third icon corresponding to the end point fact, and
omits displaying the second icon in a predetermined case.

7. The analysis system according to claim 5, wherein when a first device and a second device are designated from outside, the processor displays the attack scenario from the first device to the second device.

8. The analysis system according to claim 5, wherein
when one device is designated from outside, the processor displays the attack scenario from the one device to another device.

9. The analysis system according to claim 5, wherein
the processor identifies a network topology of devices included in the system to be diagnosed,
wherein the processor displays the attack scenario superimposed on the network topology.

10. The analysis system according to claim 5, wherein
in the case where it is possible to trace from the start point fact to the end point fact, the processor generates an attack pattern that includes at least an attack condition, an attack result, and an attack means, and
wherein the processor displays the attack pattern associated with the attack scenario along with the attack scenario.

11. An analysis system comprising:
a memory storing instructions; and
a processor configured to execute the instructions to:
receive an attack graph regarding a system to be diagnosed, and
search for, in the attack graph, a pair of a combination node indicating a combination of a device, an attack state, and privileges, and a combination node next to the combination node;
generate an attack scenario which is information that represents a transition relationship of a combination of the device, the attack state, and the privileges that correspond to the attack state, for each pair of the combination nodes;
display the generated attack scenario on a display device by
displaying a second icon representing the privileges in a first icon representing the device;
displaying a third icon representing the attack state in the second icon, for each of a start point combination node and an end point combination node in a pair of the combination nodes; and
displaying an edge extending from the third icon corresponding to the start point combination node to the third icon corresponding to the end point combination node; and
omit displaying the second icon in a predetermined case.

12. The analysis system according to claim 11, wherein
when a first device and a second device are designated from outside, the processor displays the attack scenario from the first device to the second device.

13. The analysis system according to claim 11, wherein
when one device is designated from outside, the processor displays the attack scenario from the one device to another device.

14. The analysis system according to claim 11, wherein
the processor identifies a network topology of the devices included in the system to be diagnosed,
wherein the processor displays the attack scenario superimposed on the network topology.

15. The analysis system according to claim 11, wherein
the processor generates an attack pattern that includes at least an attack condition, an attack result, and an attack means, for each pair of the combination nodes, and
wherein the processor displays the attack pattern associated with the attack scenario along with the attack scenario.

16. A non-transitory computer-readable recording medium storing an analysis program executable by a computer to perform processing comprising:
generating a fact which is data representing a security situation of a system to be diagnosed, based on information regarding each device included in the system to be diagnosed; and
generating one or more pairs of a start point fact which is a fact representing an attack in the device that is a start point and an end point fact which is a fact representing an attack in the device that is an end point, analyzing, for each pair, whether or not it is possible to trace from the start point fact to the end point fact, based on facts representing states of the devices generated based on information regarding the device that is the start point and information regarding the device that is the end point, the start point fact, and one or more analysis rules for analyzing the attack; and
generating an attack scenario which is information that represents a transition relationship of a combination of the device, an attack state, and privileges that can correspond to the attack state according to the start point fact and the end point fact, in a case where it is possible to trace from the start point fact to the end point fact.

* * * * *